United States Patent
Itoh et al.

[11] Patent Number: 5,951,843
[45] Date of Patent: Sep. 14, 1999

[54] METHOD AND APPARATUS FOR EXTRACTING LITHIUM BY APPLYING VOLTAGE ACROSS LITHIUM-ION CONDUCTING SOLID ELECTROLYTE

[75] Inventors: Mitsuru Itoh, Yokohama; Yoshiyuki Inaguma, Yamato; Shigeru Iijima, Nagoya, all of Japan

[73] Assignee: NGK Spark Plug Co., Ltd., Nagoya-shi, Japan

[21] Appl. No.: 08/939,090

[22] Filed: Sep. 26, 1997

[30] Foreign Application Priority Data

| Sep. 26, 1996 | [JP] | Japan | 8-277122 |
|---|---|---|---|
| Sep. 26, 1996 | [JP] | Japan | 8-277123 |
| Sep. 26, 1996 | [JP] | Japan | 8-277124 |

[51] Int. Cl.$^6$ ................ C25B 1/00; C25B 9/00
[52] U.S. Cl. .............. 205/560; 205/770; 204/263; 204/260; 204/284; 204/237; 204/262; 204/257; 204/296
[58] Field of Search ................ 205/560, 770; 204/263, 296, 260, 262, 237, 284, 257

[56] References Cited

U.S. PATENT DOCUMENTS

| 4,203,819 | 5/1980 | Cope | 204/247 |
|---|---|---|---|
| 4,780,186 | 10/1988 | Christini et al. | 205/407 |
| 5,198,081 | 3/1993 | Kanoh et al. | 205/560 |

FOREIGN PATENT DOCUMENTS

| 2 338 897 | 8/1977 | France . |
|---|---|---|
| 56-50113 | 5/1981 | Japan . |
| 56-160320 | 12/1981 | Japan . |
| 58-156530 | 9/1983 | Japan . |
| 59-195525 | 11/1984 | Japan . |
| 63-39678 | 8/1988 | Japan . |
| 1-160820 | 6/1989 | Japan . |
| 5-25541 | 4/1993 | Japan . |
| 5-339771 | 12/1993 | Japan . |
| 7-316865 | 12/1995 | Japan . |
| 2 010 575 | 6/1979 | United Kingdom . |

OTHER PUBLICATIONS

Itoh, M. et al., "High Lithium Ion Conductivity in the Perovskite–Type Compounds $Ln_{1/2}Li_{1/2}TiO_3$(Ln=La,Pr,Nd, Sm)", *Solid State Ionics*, 70/71, pp. 203–207, 1994. (No Month).

Inaguma, Y. et al., "Lithium Ion Conductivity in the Perovskite–Type $LiTaO_3$–$SrTiO_3$ Solid Solution", *Solid State Ionics*, 79, pp. 91–97, 1995. (No Month).

Inaguma, Y. et al., "High Ionic Conductivity in Lithium Lanthanum Titanate", *Solid State Communications*, vol. 86, No. 10, pp. 689–693, 1993. (No Month).

Inaguma, Y. et al., "Candidate Compounds with Perovskite Structure for High Lithium Ionic Conductivity", *Solid State Ionics*, 70/71, pp. 196–202, 1994. (No Month).

Shan, Y.J. et al., "Lithium Insertion into Ceramic $SrVO_{3-\delta}$", *Solid State Ionics*, 70/71, pp. 429–433, 1994. (No Month).

Oguni, M. et al., "Calorimetric and Electrical Studies on the Positional Disorder of Lithium Ions in Lithium Lanthanum Titanate", *Solid State Communications*, vol. 91, No. 8, pp. 627–630, 1994. (No Month).

(List continued on next page.)

*Primary Examiner*—Donald R. Valentine
*Attorney, Agent, or Firm*—Morgan, Lewis & Bockius LLP

[57] ABSTRACT

A method and apparatus for electrolytically extracting lithium at high purity and high efficiency are disclosed, in which the apparatus 1 includes a partition 2 constituted mainly of a perovskite-type Li ion conducting solid electrolyte, a feed chamber formed on one side of the partition in which a crude liquid containing a lithium component and impurities is introduced so as to come into contact with the partition, a recovery chamber formed on the other side of the partition in which a liquid for recovery is introduced so as to come into contact with the partition, and a means for applying an electrical field to the partition in such a manner that the crude liquid side is positive and the recovery liquid side is negative. On applying an electrical field to the partition, the lithium component of the crude liquid selectively passes through the partition in the form of Li ions into the recovery side.

31 Claims, 12 Drawing Sheets

OTHER PUBLICATIONS

Itoh, M. et al., "Control of Ferromagnectic Transition Temperature of $La_xMn_yO_3$ By Lithium Insertion", *Solid State Communications*, vol. 97, No. 3, pp. 179–182, 1996. (No Month).

Inaguma, Y. et al., "Review on Recent Studies of Lithium Ion Conducting Oxides", *Report of the Research Laboratory of Engineering Materials*, No. 29, pp. 71–77, 1995. No. Month.

Shan, Y.J. et al., "Oxide Cathode with Perovskite Structure for Rechargeable Lithium Batteries", *Journal of Power sources*, 54, pp. 397–402, 1995. (No Month).

Inaguma, Y. et al., "The Effect of the Hydrostatic Pressure on the Ionic Conductivity in a Perovskite Lanthanum Lithium Titanate", *Journal of Electrochemical Society*, vol. 142, No. 1, pp. L8–L11, 1995. (No Month).

Tuller, Harry L., et al., *Fast Ion Conductors: Future Trends*, 8347 Materials Science & Engineering B1 Nov. (1988), No. 2., Lausanne, CH, pp. 171–191. (No Month).

TiO6 OCTAHEDRON

○    O ion

◍    Li or La ion

⊕    Ti ion

METHOD AND APPARATUS FOR EXTRACTING LITHIUM BY APPLYING VOLTAGE ACROSS LITHIUM-ION CONDUCTING SOLID ELECTROLYTE

FIELD OF THE INVENTION

This invention relates to a method and apparatus for extracting lithium, particularly a method and an apparatus for efficiently extracting only a lithium component from a solution containing lithium and impurities.

BACKGROUND OF THE INVENTION

In recent years metallic lithium or lithium compounds such as lithium salts, have been used in various fields. Their application typically includes lithium batteries, lithium-containing ceramic materials, coolant adsorbents, pharmaceuticals, aluminum alloying materials, and nuclear fusion fuel materials, and the like. The metallic lithium or lithium compounds have been obtained from Li-containing ore, such as spodumene, amblygonite, petalite, and lepidolite; brine; or geothermal water. For example, the lithium is extracted from these raw materials, in the form of a lithium salt, by adsorption using an adsorbent (e.g., aluminum hydroxide) or electrolysis using an ion-exchange membrane made of resin. Having found a use as a power source of small-sized appliances, such as watches, cameras, calculators, and IC cards, lithium batteries have been enjoying a drastically increasing demand, and used lithium batteries have been increasing concomitantly. Accordingly, attention has been paid to the reuse or recycle of the lithium component from the used lithium batteries.

Of the above-mentioned extraction methods, the adsorption method hardly produces high purity lithium salts due Lo the low extraction efficiency so that a step of purification is needed. Therefore, this method may be disadvantageous from the standpoint of labor and cost. On the other hand, the electrolysis method is a technique in which lithium (Li) ions are electrically moved through an ion-exchange membrane made of resin. The efficiency by the electrolysis method is not satisfactory because not only Li ions but hydrogen ions pass through the ion-exchange membrane

SUMMARY OF THE INVENTION

An object of the present invention is to provide a method and apparatus for extracting lithium at high purity and high efficiency from aqueous solution containing lithium.

Another object of the present invention is to provide a method and apparatus for concentrating or rather condensing a lithium-containing liquid.

A still another object of the present invention is to provide a method and apparatus for efficiently refining a liquid containing lithium and impurities.

A further object of the present invention is to provide a method and apparatus for efficiently purifying an aqueous solution containing lithium.

A still further object of the invention is to provide a method and apparatus for accelerating extraction of lithium ions from an aqueous solution.

A still further object of the invention is to provide a method and apparatus for efficiently and inexpensively producing a lithium salt of high purity from an aqueous solution containing lithium.

According to an aspect of the present invention, the foregoing and the other objects are attained by the method and apparatus, wherein a lithium-ion conducting solid electrolyte is utilized as a partition (or rather separator) which separates a crude solution containing lithium from a lithium-collecting solution and wherein a means for applying an electric field (or rather voltage) across said partition is so arranged that only lithium ions are forced to transfer through said partition from said crude solution to said lithium-collecting solution. More specifically, the present invention provides a method for extracting lithium from a crude liquid containing at least lithium ions; which comprises bringing the crude liquid into contact with one side of the partition constituted mainly of a lithium-ion conducting solid electrolyte (hereinafter referred to as an Li solid electrolyte or simply as a solid electrolyte) while bringing another liquid (hereinafter referred to as recovery liquid) into contact with the other side of the partition, and applying an electrical field across the partition in such a manner that the crude liquid side is positive and the recovery liquid side is negative thereby to selectively extract the lithium from the crude liquid through the partition into the recovery liquid.

The apparatus for carrying out the method of the present invention basically comprises (1) the partition constituted mainly of the Li solid electrolyte, (2) a chamber (hereinafter referred to as a feed chamber), formed on one side of the partition, into which feed chamber the crude liquid containing at least lithium ions is introduced so as to come into contact with the partition, (3) another chamber (hereinafter referred a recovery chamber) for collecting lithium, formed on the other side of the partition, into which recovery chamber a liquid for collecting lithium (hereinafter referred to as a recovery liquid) is introduced so as to come into contact with the partition, and (4) a means for applying an electrical field (or voltage) across the partition in such a manner that the crude liquid is positive and the recovery liquid is negative thereby to selectively allow the lithium in the form of ions of the crude liquid to pass through the partition into the recovery chamber.

In an embodiment of the above-described method and apparatus, the Li solid electrolyte comprises a perovskite-type solid electrolyte represented by the formula: $(La_x, Li_y)TiO_z$, wherein $x=(2/3)-a$, $y=3a-2b$, $z=3-b$, $0<a\leq 1/6$, $0\leq b\leq 0.06$, and $y>0$, including said formula in which La is substituted with other element having a larger ionic radius than that of La.

According to one aspect of the present invention, only Li ions but no other ions are transferred through the Li solid electrolyte because other element ions can not pass through the partition. The perovskite type Li ion solid electrolyte is best among other solid electrolytes for accomplishment of the invention because the perovskite type of the Li ion solid electrolyte as defined above does not deteriorate nor chemically react with a water even under electric field.

With the aids of the electric field (voltage) applied across the crude and recovery liquids separated by the partition, extraction of a high purity lithium or lithium component is accelerated and condensation of lithium in the recovery liquid is attained to the extent that a lithium concentration of the recovery liquid is higher than that of the crude liquid, according to the invention. The perovskite-type solid electrolyte exhibits an excellent Li ion selectivity and has a high bulk ion conductivity even at room temperature. Besides, it is activated stably even in the presence of water.

Therefore, according to the invention, the industrialization of efficient extraction of lithium from aqueous solution, including refinement, condensation and recovery or recycle is attained in the terms of efficiency, easiness and/or preciseness. Further, by reacting the extracted lithium with other compound such as $CO_2$, a lithium salt such as $Li_2CO_3$ at high purity is manufactured easily in mass production.

FIG. (3)b shows a chemical reactions of lithium ions with other components, in a crude liquid and a recovery liquid respectively.

Figure 4:
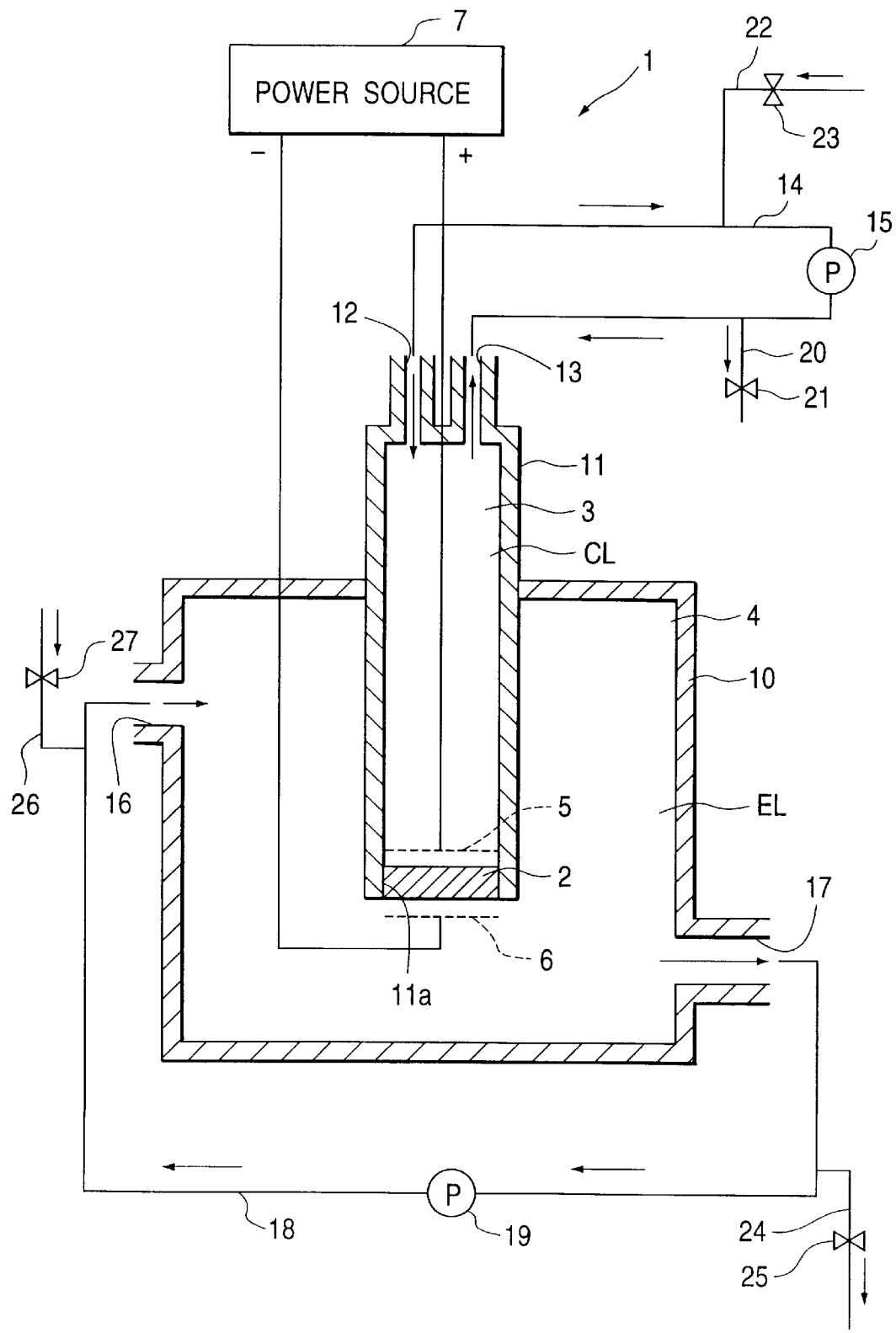

FIG. 4 is a schematic vertical sectional view of an example of the apparatus according to the invention.

Figure 5A:
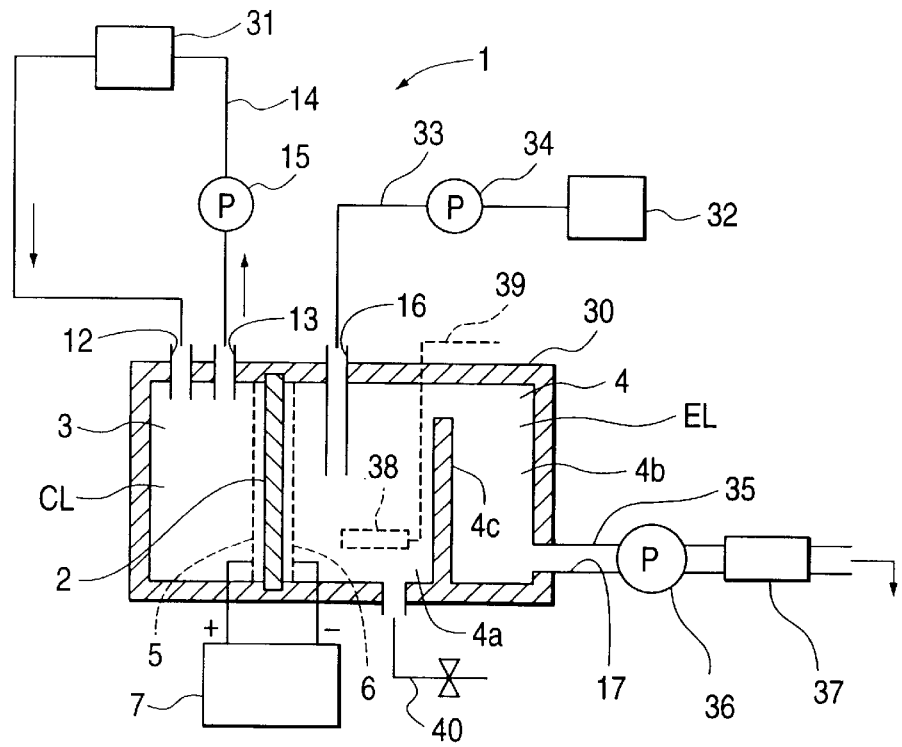

FIG. 5(a) is a schematic vertical sectional view of another example of the apparatus according to the invention.

Figure 5B:
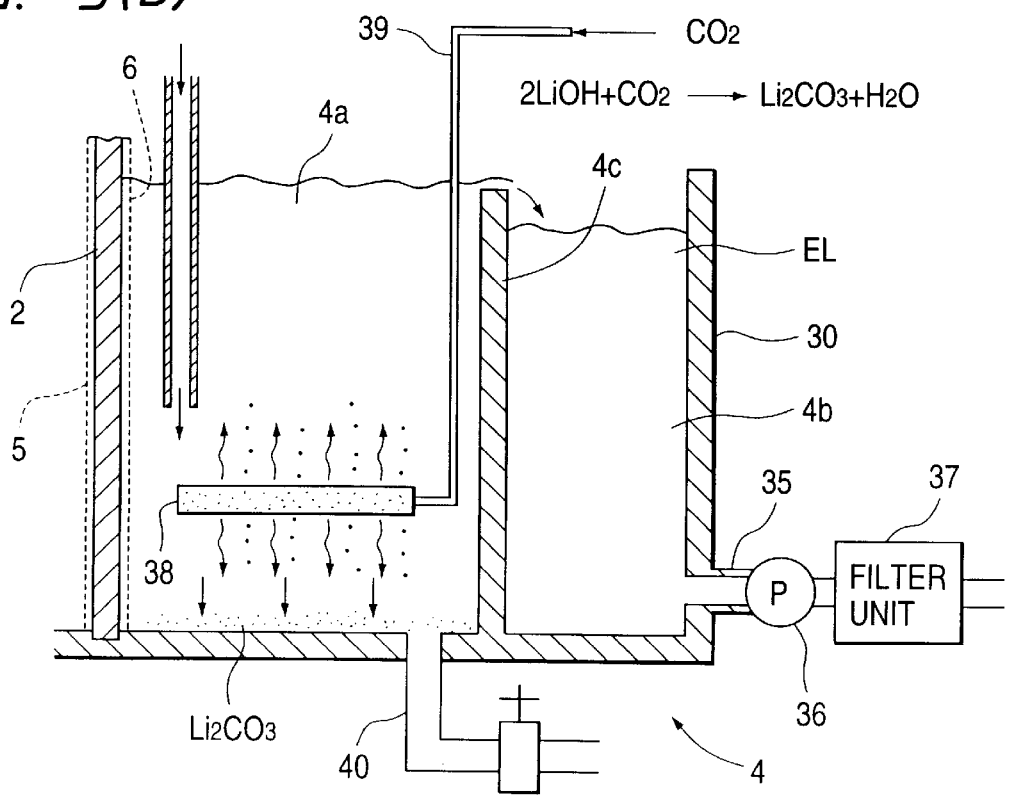

FIG. 5(b) is a schematic vertical sectional view of the apparatus for obtaining lithium in a form of lithium salt, according to an embodiment of the invention.

Figure 6A:
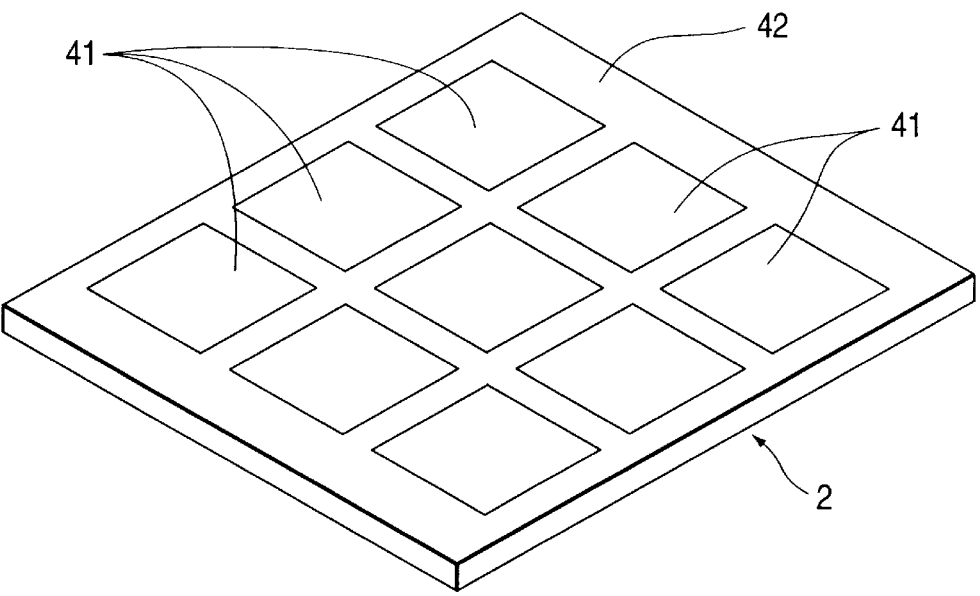

FIG. 6(a) is a schematic structure of a partition comprising plates made of lithium-ion conducting solid electrolyte, used in one of the embodied apparatus according to the invention.

Figure 6B:
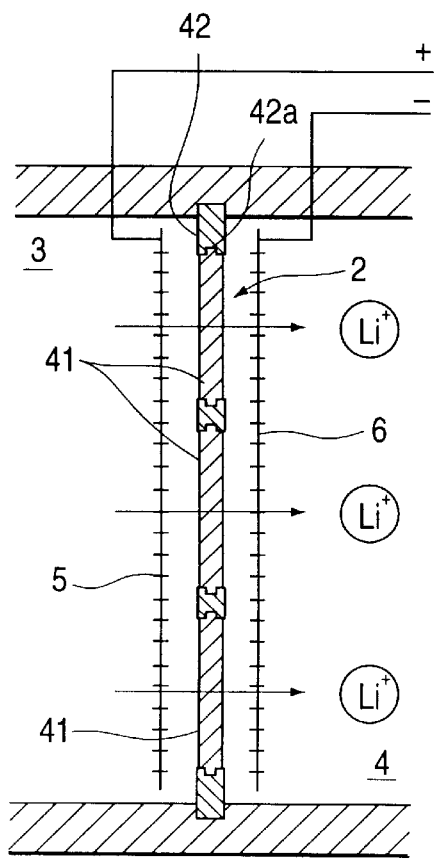

FIG. 6(b) is a vertical sectional view of the partition of FIG. 5(a), assembled with mesh electrodes across which electric field is applied to cause lithium ions to pass through the partition.

Figure 7:
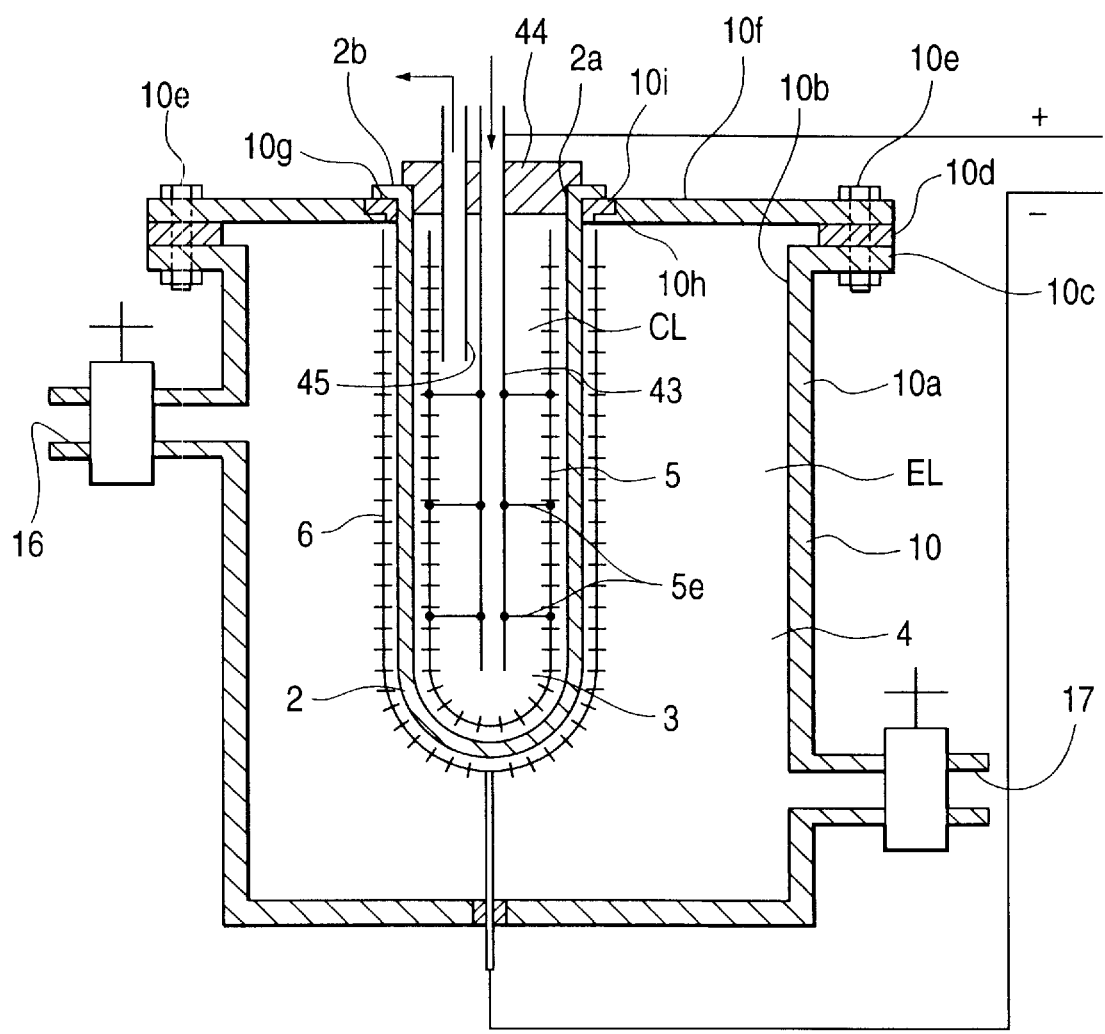

FIG. 7 is a schematic vertical sectional view of still another example of the apparatus of the invention, wherein a tube of lithium ion solid electrolyte, having one end closed but the other end open, is used as a partition separating a crude lithium liquid from a lithium recovery liquid.

Figure 8:
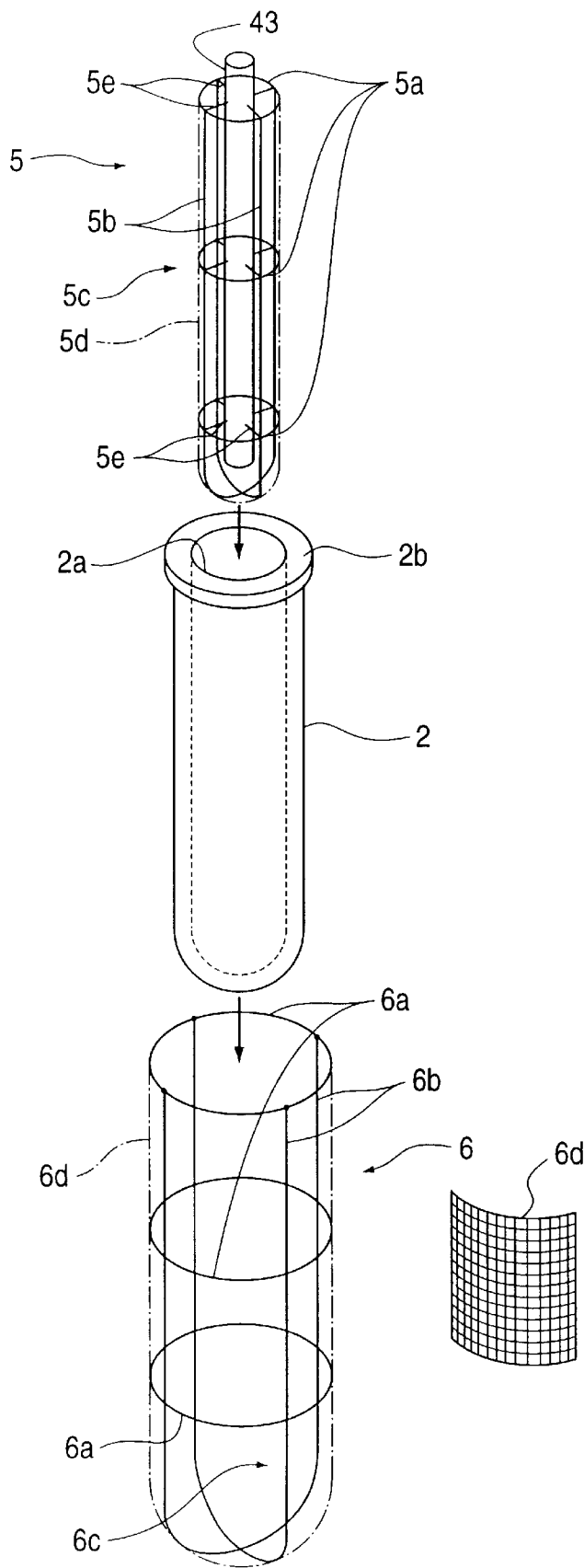

FIG. 8 is a perspective exploded view of the partition and the mesh electrodes of the apparatus as shown in FIG. 7.

Figure 9A:
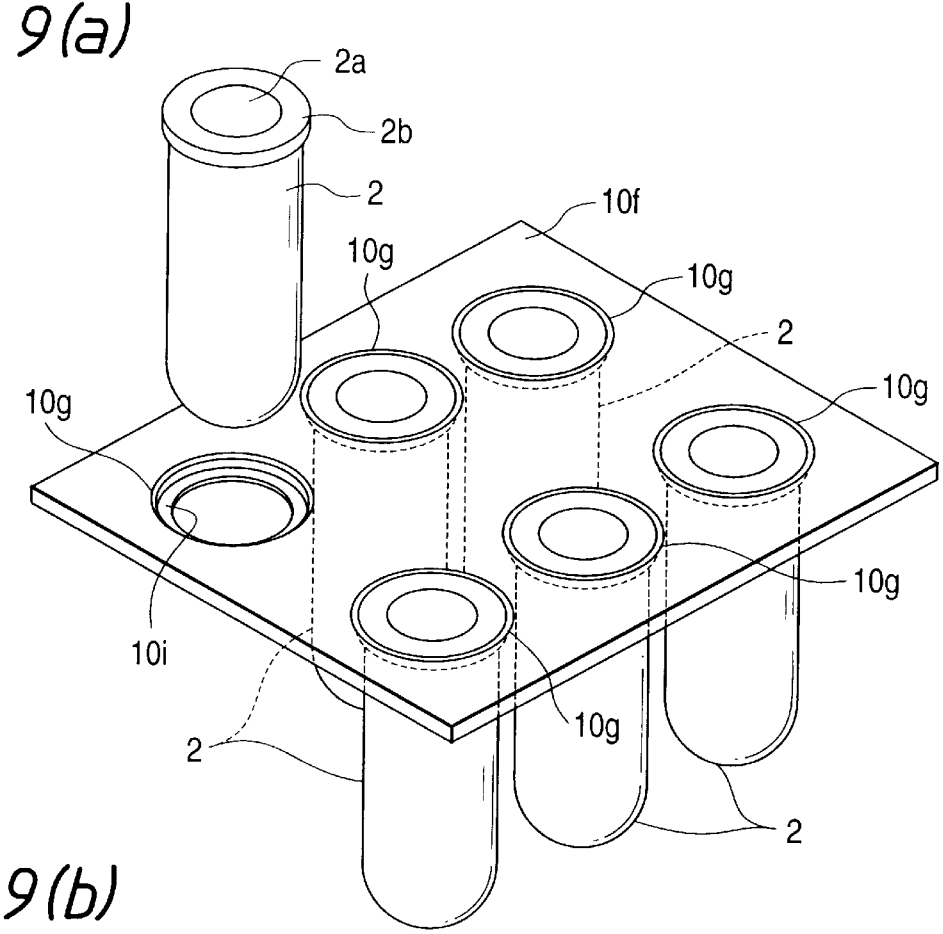

FIG. 9(a) shows an assembly of a plurality of the tubular partitions of FIG. 8 used in the apparatus embodied according to the invention.

Figure 9B:
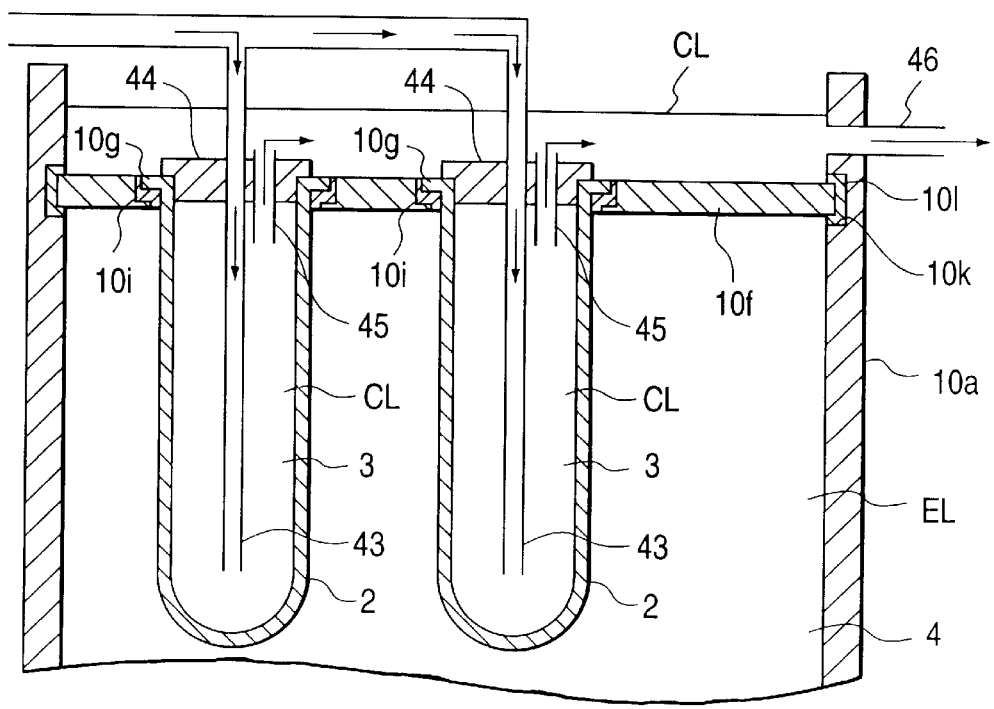

FIG. 9(b) is a perspective view and a vertical sectional view of an apparatus using the plurality of partitions as shown in FIG. 9(a), embodied according to the invention.

Figure 10:
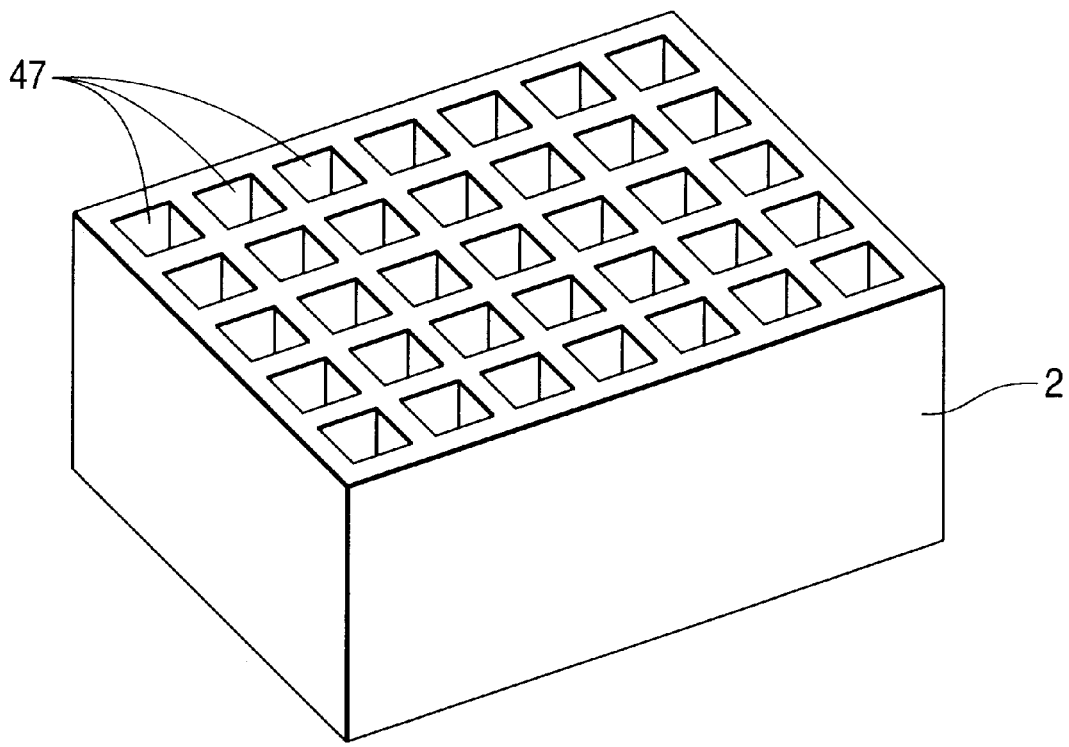

FIG. 10 is a perspective view of another partition having a honeycomb structure usable in the apparatus according to the invention.

Figure 11A:
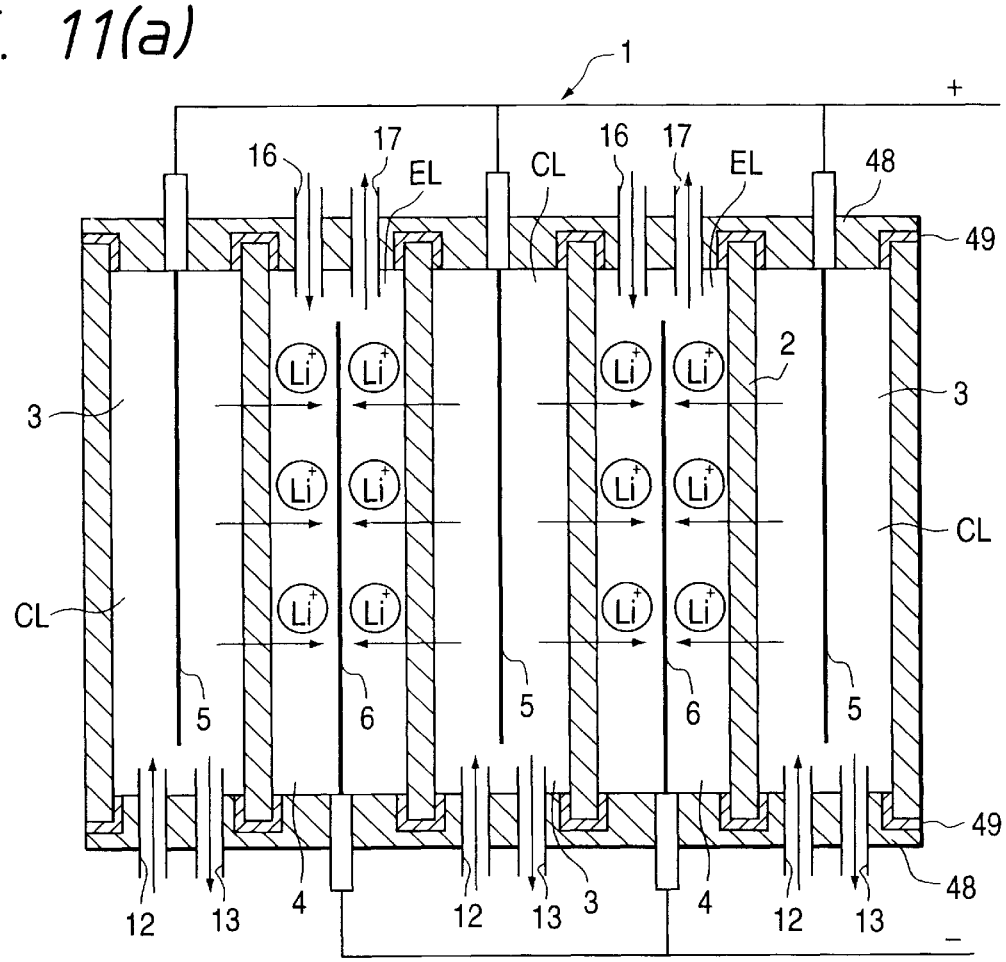

FIG. 11(a) is a schematic vertical section showing yet another example of the apparatus in which the partition of FIG. 10 is used.

Figure 11B:
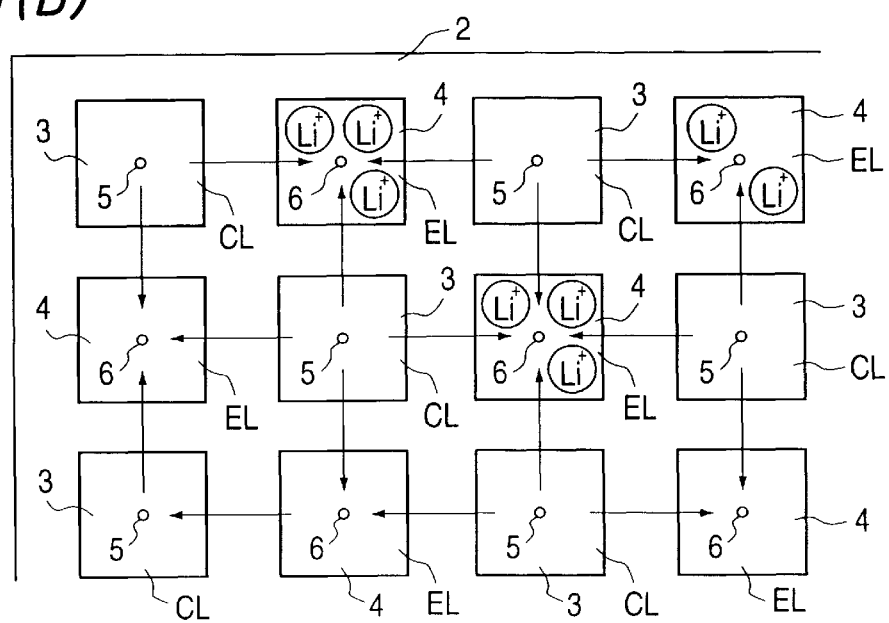

FIG. 11(b) is a schematic plan view showing a top portion of the apparatus shown in FIG. 11(a).

Figure 12:
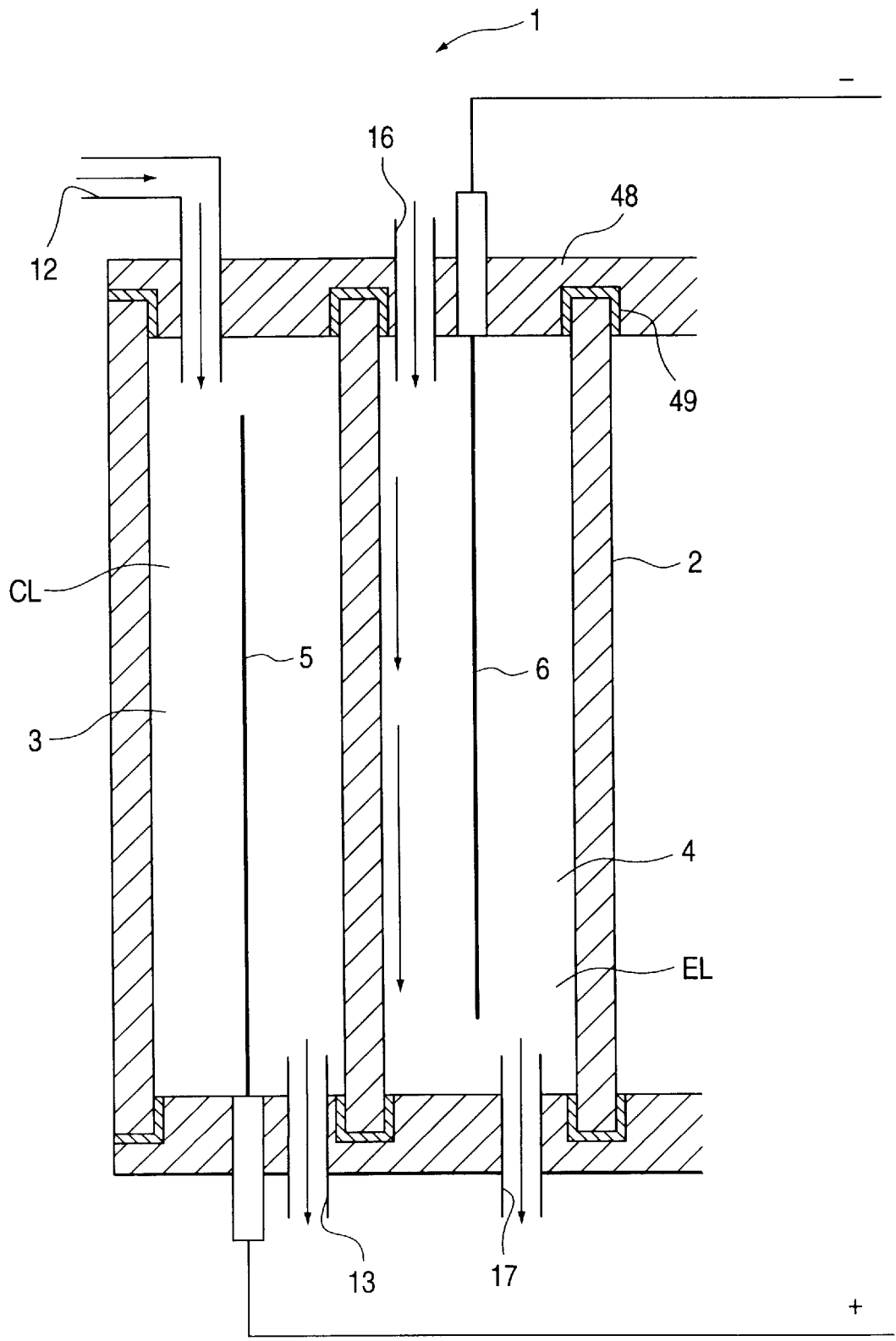

FIG. 12 is a schematic vertical section showing a modification of the apparatus of FIG. 11, in which the recovery liquid is made to flow along the wall of the partition.

DETAILED DESCRIPTION OF THE INVENTION

The lithium-extracting apparatus according to the present invention takes the following three basic inventive elements in combination.

The first inventive element is characterized by that the partition made of lithium-ion conducting solid electrolyte is used for extracting lithium only from the crude liquid containing lithium.

The partition used here can have the form of a plate as shown by the reference numeral 3 in FIG. 3 (a), on one surface of which the feed chamber 3 is formed, and on the other surface of which the recovery chamber 4 is provided. The partition 2 of such a simple shape as plate can be prepared by, for example, firing a ceramic green sheet composed of stoichiometric mixture of raw materials. The electrodes 5,6 covering over the surface of the plate partition 2 may be made of a metallic mesh. As shown in FIGS. 6 (a) and 6 (b), the partition 2 may be made up of a plurality of segments 41 with gaps between them. Every gap between the adjacent segments 41 being sealed so as to prevent the liquids from passing through and mixed up. By such a manipulation, the partition having such a large area as could hardly be formed of an integral Li solid electrolyte can easily be made up. There is no fear of the two liquids' mixing up if the gaps between the segments are sealed completely. The sealing 42 may be done by integrally molding the segments with plastic material to form the integral partition 2.

In this first inventive element, instead of the plate partition 2 as described above, as shown in FIG. 8 or FIG. 9(a), a pipe or tubular partition 2 with the one end closed and the other end open, may be preferably used, because the inside of the tubular partition 2 can be used as either the feed chamber or the recovery chamber. When the crude or recovery liquid is put in the inside of such tubular chamber, the liquid is surrounded by the partition and therefore, it is easy and handy to form a radial and uniform electric field cross the partition 2, which leads to an improved efficiency of lithium extraction in comparison to the plate partition. If the tubular partition 2 with its both open ends is used as shown in FIG. 12 and either one of the crude and recovery liquids is flown in succession through the inside thereof by means of continuously feeding the lithium-containing liquid, the continuous extraction of lithium may be easily attained in a recovery chamber contacting the outside or inside surface of the partition. The partitions in total can be made in a shape of honeycomb as shown in FIG. 10, in which hollows of the honeycomb can be used as the crude or recovery chambers and the walls made by honeycomb hollows 47 may be used as the partitions. By using the honeycomb-shaped partition in the apparatus for extracting lithium in the form of ions, high efficient extraction or transfer of lithium from the crude solution to the recovery liquid is attained because most of the wall of honeycomb hollows can be utilized as the partitions which allow lithium ions to pass through them, as shown in FIG. 11(b).

The second inventive element composed in the apparatus of the invention is characterized in that the electrodes across which an electric voltage is applied are placed along the surfaces of the partition which has two surfaces opposing each other, contacting either the crude liquid or the recovery liquid and separating the two liquids. In this configuration when extraction of lithium is desired in acceleration, the electrode placed along the partition which contacts the crude liquid is set electrically positive and the other electrode placed along the other surface of the partition which contacts the recovery liquid is set electrically negative as shown in FIG. 3 (a).

In an aspect of the second inventive element, the electric field caused by the voltage applied across the electrode can be uniformly made across the liquids existing between the electrodes intervened with the partition, if the shape of the electrode(s) are net or mesh as shown by the reference numeral 6d of FIG. 8 and if they cover the surfaces of the partition in a uniform distance as shown in FIGS. 6(b), 7 and 8. As a result of this, the partition 2 made up of the Li solid electrolyte of perovskite type can be made full use of, thereby securing a further increased efficiency of lithium extraction.

The third inventive element of the apparatus is characterized by forming at least one chamber, with the portion the partition made of the Li-conducting solid electrolyte. If the plate partition is used to make a part of the inside wall surface of the chamber contacting the crude liquid, the other surface of the wall becomes a part of another chamber contacting the recovery liquid. If the partition in the form of cup-shape or pipe-shape having its one end closed, either one of the feed and recovery chambers may be unnecessary because the partition itself forms a chamber. If the partition is made like a honeycomb as previously described, each of the honeycomb hollows surrounded by a honeycomb wall can be either the feed or recovery chamber to which the crude or recovery liquid is introduced respectively.

The apparatus of the present invention may further comprise the fourth inventive element which is characterized in that a means for feeding and discharging the crude liquid to or from the feed chamber and a means for continuously feeding and discharging the recovery liquid. These means are for instance, pumping motors flow meters, valves for some openings etc. necessary to feed or discharge the liquids to or from the chambers, by which the feed and discharge of the crude liquid and the recovery liquid can be carried out in a continuous manner so that even a large quantity of a crude liquid and recovery liquid can be treated with good efficiency.

More specifically in regard to a preferred embodiment of, the above fourth inventive element, the apparatus further having the following structure is preferable; i. e., the crude liquid fed from a feed opening of the feeding means is made to flow along the wall of the partition and then discharged from a discharge opening of the discharging means. By this structure, even though a deposit may adhere to the partition or the electrode contacting the crude liquid in the feed chamber, the flow of the crude liquid effects washing away the deposit and thereby prevents reducing an electrical current efficiency through the partition. The apparatus may be preferably provided with a circulating means for recycling the crude liquid discharged from the feed chamber to the feed opening thereof In this way the crude liquid is repeatedly brought into contact with the partition by the circulation so that the lithium can be extracted from the crude liquid to the recovery liquid efficiently without waste.

The apparatus may also preferably have a similar structure in the recovery chamber; the recovery liquid fed from an opening of the feeding means is made to flow along the wall of the partition and then discharged from a discharge opening of the feed chamber by the discharging means. For example, where an aqueous solution including water is used as a recovery liquid, the extracted Li component produces LiOH in the recovery side, which tends to be deposited on the partition and/or the electrode in the recovery side According to the above structure the flow of the recovery liquid along the wall of the partition washes off the deposit such as LiOH, thereby to prevent reducing the electrical current efficiency through the partition. Similar to the feed chamber, the circulating means for returning the discharged recovery liquid to the recovery chamber is effective for the recovery chamber. Thus, the recovery liquid can be repeatedly brought into contact with the partition by the circulation means to efficiently increase (or rather condense) the lithium concentration of the liquid in the recovery chamber.

In order to obtain a purified lithium salt efficiently, the method and apparatus of the present invention may preferably need a fifth inventive element, i.e.; a precipitant capable of reacting with the extracted lithium existing as lithium ions in the recovery chamber may be added to the recovery liquid. The lithium component in LiOH of the recovery liquid is immobilized as a result of the precipitation, and the concentration of the dissolved lithium component in the liquid is reduced. By this, the deposit of LiOH, stuck on the partition or electrode is inhibited. Useful precipitants for this use include carbon dioxide ($CO_2$) which reacts with a dissolved lithium component to form a soluble lithium carbonate ($Li_2CO_3$). The recovery chamber may be provided with a means for bubbling the recovery liquid by the gas of $CO_2$. The recovery chamber may also have another means for separating the lithium-containing precipitate from the recovery liquid, thereby facilitating to renew the liquid by circulation. The means for separating the precipitate may be a structure having a filter which passes the recovery liquid but collects the precipitate.

The Li solid electrolyte which is used as the partition in the present invention includes a perovskite-type solid electrolyte represented by the formula: $(La_x, Li_y)TiO_z$, wherein $x=(2/3)-a$, $y=3a-2b$, $z=3-b$, $0<a\leq 1/6$, $0\leq b\leq 0.06$, and $y>0$. This perovskite-type solid electrolyte, as previously described, exhibits the excellent Li ion selectivity and high bulk ion conductivity even at the room temperature. Besides, it acts stably even in the presence of water. Therefore, the extraction of Li ions, particularly from the aqueous solution can be achieved precisely and efficiently, as this electrolyte is utilized as the partition to filtrate Li ions only for extraction, concentration, and purification of lithium and for lithium salt production etc. in the embodiments of the invention.

In the above formula representing the perovskite-type solid electrolyte, the a is adjusted at 1/6 or less (exclusive of zero). If the a is more than 1/6, there will be crystal phases (e.g., $Li_2TiO_3$ and $Li_2Ti_3O_7$) different from the perovskite structure, resulting in decrease of the Li ion conductivity of the partition and impairment of the lithium extraction effect thereof. If the a is zero, there is no Li ion as a conducting carrier per formula weight, and the compound to be used as the partition no longer functions as a Li ion conductor.

The b in the above formula is adjusted at 0.06 or less. The value b is a parameter specifying the vacancy content created in the site of oxygen ions forming the skeleton of a perovskite-type crystal structure as hereinafter described. If the b exceeds 0.06, the vacancy content increases excessively, tending to make the perovskite-type crystal structure instable. Then, it may follow that the Li ion conductivity is reduced to ruin the Li extraction effect.

In order for a solid electrolyte to retain the perovskite-type crystal structure to be used for the method and apparatus of the invention, the numbers of La ions and Li ions per formula weight should be represented by $x=(2/3)-a$ and $y=3a-2b$, respectively. Taking the values a and b into account, x should preferably range from 1/2 to 2/3 (excluding 2/3), and y should preferably range from 0 to 1/2 (excluding 0). If the x exceeds 2/3, the relative amount of Li ion decreases considerably resulting in reduction of Li ion conductivity of the partition, which leads to an impractical reduction of the Li extraction effect. If the x is less than 1/2, different phases having a crystal structure other than the perovskite structure appear, tending to reduce the Li ion conductivity of the partition. The value x in a preferable range is from 0.5 to 0.6. As to the y, if it exceeds ½, there will be different phases having a crystal structure other than the perovskite structure, and if the y is 0, the oxide compound no longer functions as an Li ion conductor for the partition. The value y in a preferable range is 0.1 to 0.4.

The partition made of the Li conducting solid electrolyte as shown above can be prepared by, for example, the process comprising the following steps as numbered (1), (2) and (3).
(1) Oxides of metallic elements or their compounds (such as nitrates and carbonates) that are convertible to corresponding oxides on heat treatment in an oxidizing atmosphere are blended to prepare a raw material mixed powder having a stoichiometric composition for the solid electrolyte. For instance, the mixed powder of $La_2O_3$, $Li_2CO_3$, and $TiO_3$ may be preferably made by this. The mixed powder is then heated to 800 to 1100° C., preferably 900 to 1000° C., to synthesize a perovskite-type compound powder.
(2) The perovskite-type powder is then formed into an unfired green body of a predetermined shape by a known forming method such as pressing (inclusive of cold hydrostatic pressing), injection molding, extrusion molding, slip casting (forming step). Before the forming, a small amount of a binder may be added to the powder to easily form the green body for the unfired partition.
(3) The resulting unfired partition (green body) is then fired at 1100 to 1400° C., by a general sintering method including hot pressing and hot isostatic pressing.

Without preparing a perovskite type compound as shown in the above step (1), the raw material mixed powder after being formed in a desired shape of unfired partition can be sintered to obtain the fired perovskite type lithium ion conducting solid.

Figure 1:
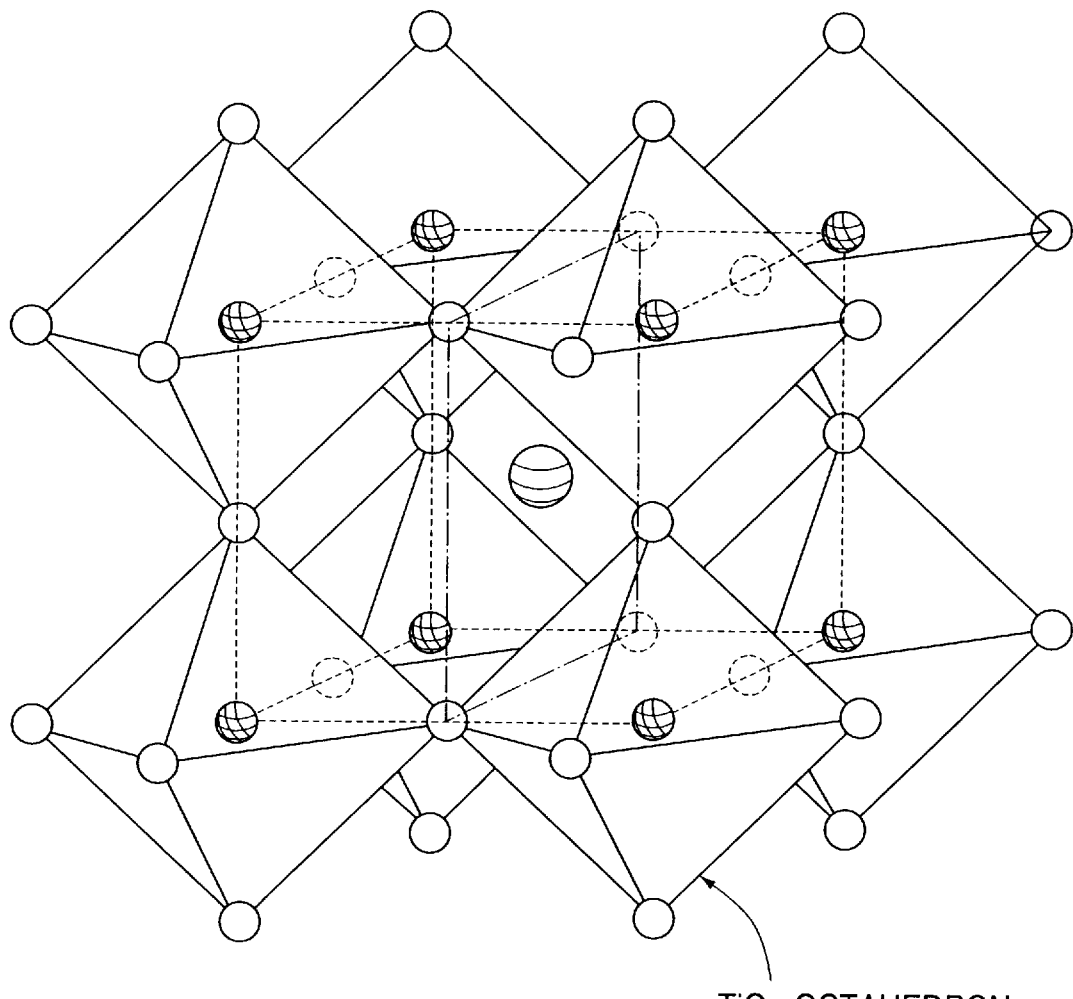
FIG. 1 is a model showing the crystal structure of a lithium ion conducting solid electrolyte of perovskite type to be utilized in the present invention.

It is considered that the above-described perovskite-type solid electrolyte exhibits Li ion conductivity based on the following mechanism. FIG. 1 schematically illustrates a unit cell of the solid electrolyte with an idealized perovskite structure. In the unit cell, Ti ions are in the sites corresponding to the apices of a cubic lattice (hereinafter referred to as B-sites), and a La or Li ion is in the site corresponding to the centroid of the cubic lattice (hereinafter referred to as A-site) Six oxygen ions are coordinated around each Ti ion to form a regular octahedron, and the $TiO_6$ octahedra are linked three-dimensionally to build up crystals. Taking into consideration sharing of ions by adjacent unit cells and adjacent oxygen octahedra, a unit cell comprises one La or Li ion, one Ti ion and three oxygen ions, giving a chemical formula (La, Li)$TiO_3$, which is equivalent to the above formula wherein x=y=0.5 and z=3.

In an ideal perovskite structure, the total number of La and Li ions per formula weight (i.e., x+y) ought to be 1. However in this structure, it is possible to make (x+y) less than 1 by controlling the x and y values while maintaining electrical neutrality of the whole crystal, thereby to provide a vacancy in A-site. Formation of the vacancy in A-site necessarily causes generation of a vacancy in the oxygen ion sites so as to maintain the electrical neutrality of the whole crystal. Accordingly, by using the parameter a which decides the Li ion content and also using the parameter b which decides the vacancy content generated in the oxygen ion sites, the aforesaid solid electrolyte can be represented by the formula $(La_x, Li_y)TiO_z$ wherein x=(⅔)−a, y=3a−2b, z=3−b, 0<a≦⅙, 0≦b≦0.06, and y>0.

Figure 2:
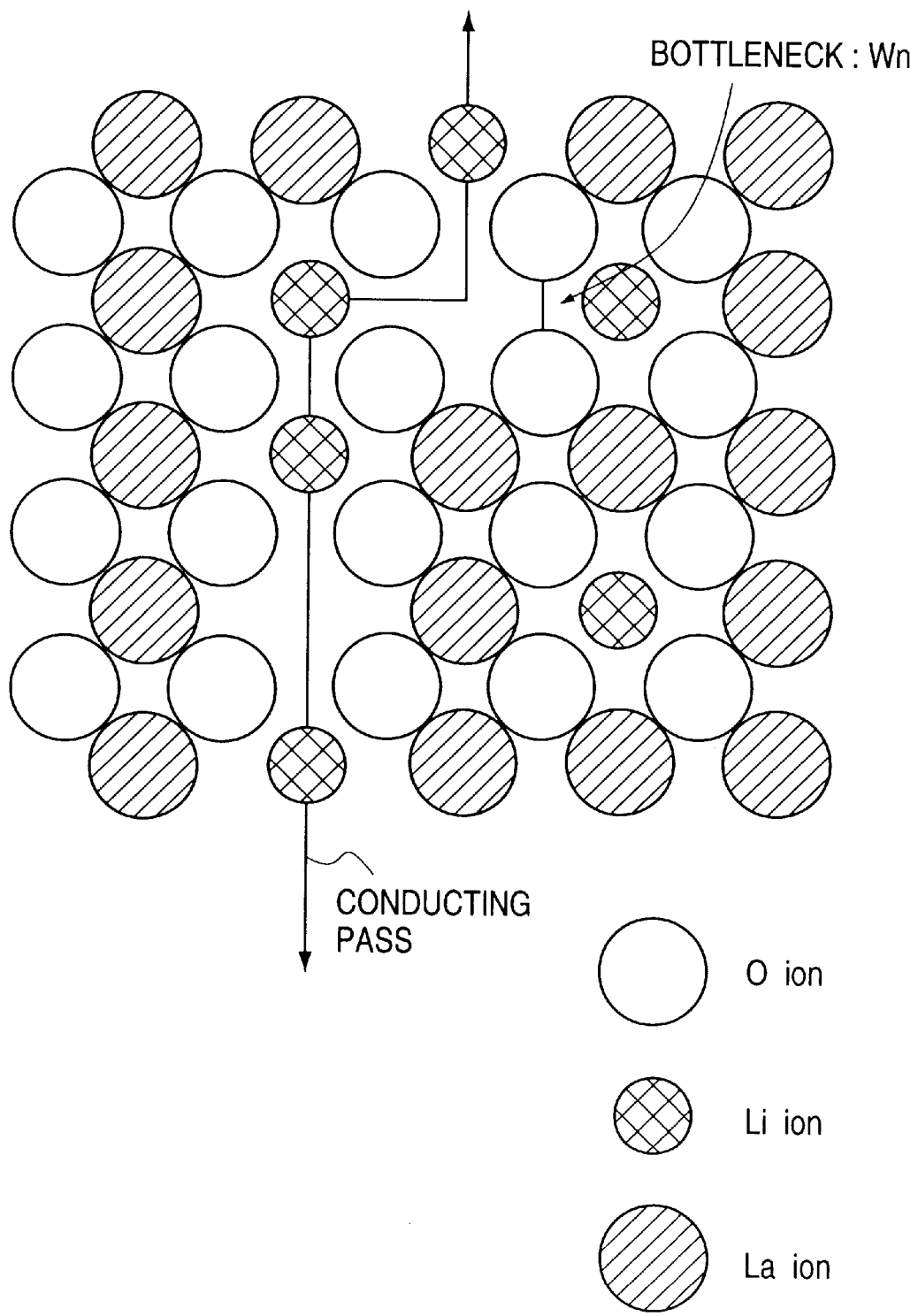
FIG. 2 is a schematic drawing illustrating a theorized mechanism of lithium ion conduction in the lithium-ion conducting solid electrolyte.

FIG. 2 shows an ion arrangement in the (100) plane of the above-described crystal structure, (corresponding to the plane surrounded by the dotted broken lines in FIG. 1). Assuming that Li ions migrate in the crystal, the narrowest interstitial passageway called "bottlenecks" on the (100) plane is located in the sites sandwiched in between two oxygen ions (the sites surrounded by four oxygen ions when seen three-dimensionally). Compared with an La ion, an Li ion has a smaller radius and is capable of passing through the bottlenecks as referenced as Wn in FIG. 2. If Li ions and vacancies are linked from one end of the crystal to the other via the bottlenecks, there is provided an ion conduction channel. On an electrical field being applied across the crystal, Li ions are considered to migrate along the channel so that the crystal achieves ionic conduction. It seems that La ions make no contribution to the ionic conduction because it has too large an ionic radius to pass through the bottleneck Wn.

Most of the metallic ions have a larger ionic radius than that of Li ion and hardly pass through the bottlenecks, failing to cause the ion conduction channel. This seems to be a reason for the excellent Li-ion selectivity of the solid electrolyte against other metallic ions. Further, the solid electrolyte to be utilized for the invention is excellent in property of blocking hydrogen ions (protons), probably because that the hydrogen ions are generally present in the aqueous solution in the form of oxonium ions ($H_3O^+$) which are too large in their sizes of ions to enter the ionic channels.

From the standpoint of vacancy concentration, the solid electrolyte can also be represented by the formula; $La(Li_{1-Q}[\ ]_Q)TiO_{z-J}$, wherein J is a parameter of oxygen defect; [ ] is a vacancy, and Q is a vacancy ratio. If the total number of Li ion sites, i.e., the number of the sites occupied by Li ions and the number of the vacant sites, is about 0.31 or less, the absolute sum of the Li ions and vacancies tends to be insufficient for the Li ions to be linked via vacancies to make ion-conduction channels from end to end of the crystal. As a result, the channels for ion conduction is insufficient in number for assuring a satisfactory ion conductivity of the solid electrolyte. Accordingly, the total value of the Li ion sites is desirable to be larger than the above value of 0.31. If the Li ion concentration is too high, i.e., if the value a in the above formula exceeds ⅙, the Li ions tend to enter B-sites where they are energetically more stable than in A-sites, and cause to generate a different phase having a crystal structure other than a perovskite structure in the solid electrolyte, and accordingly the reduction of its ion conductivity ensues. If the a is 0, the number y of Li ions, representing a conducting carrier per formula weight, becomes 0, causing the loss of the Li ion conductivity.

In some cases, addition of an element to the electrolyte material is effective in dilating the bottleneck of the solid electrolyte, resulting in improving the ion conductivity and Li ion extraction efficiency. More specifically, it is effective to substitute part of La ions with metallic ions having a larger ionic radius, for example, Sr ions. With the La ions substituted by other metallic ions as described above a frame of the surrounding oxygen ions is expanded. It seems accordingly to follow that the size of the bottleneck Wn (see FIG. 2) is increased to allow Li ions to pass more easily. In the case of using Sr, La is preferably substituted with Sr in a proportion of not more than 30 atm %. If the degree of substitution exceeds 30 atm %, the ion conductivity tends to decrease. A more preferable degree of the La substitution with other metallic ions is 10 to 20 atm %.

Various inventive elements that may be added appropriately to the lithium extraction apparatus according to the present invention will hereinafter be described in detail.

Both the crude liquid and recovery liquid may mainly comprise water. The Li solid electrolyte such as the above-described perovskite-type Li solid electrolyte acts stably in the presence of water. For example, an Li ion-containing aqueous solution such as sea water can be used as a crude liquid, and distilled water as a recovery liquid.

The ion conductivity of the solid electrolyte and the Li ion extraction efficiency of the present device can be improved by increasing the temperatures of the crude liquid and the recovery liquid from the room temperature Note however that too high the temperatures of the crude liquid and recovery liquid may raise a problem of liquid evaporation. Where both the liquids mainly comprise aqueous solution like water, therefore, the elevated temperature may be preferably controlled below the boiling point of the aqueous solution by a temperature control means. While a heater may be separately provided as such a temperature control means, Joule's heat generated in the partition may be utilized instead for heating the crude liquid and recovery liquid, which leads to simplification of the apparatus and cost reduction.

The means for applying an electrical field comprises a pair of electrodes set in contact or close to and sandwiching the partition, by which the electrical field is applied across the thickness of the partition, i.e., across a pair of the electrodes. The electrodes and the partition can be separately prepared, and can be assembled together in the actual use.

The electrodes are preferably set close to both surfaces of the partition thereby the contact of the crude liquid and the recovery liquid with the partition, is assured, and at least one of the electrodes is placed covering along the surface of the partition.

According to this structure, the an electrical field can be uniformly applied to the partition. The distance between the electrode and the partition is preferably in the range of 1–30 mm, more preferably 5–15 mm. As a result, the partition made of the Li solid electrolyte can be made full use of, thereby securing a further increased efficiency of lithium extraction.

The partition can have the form of a plate having two major surfaces, on one of which a feed chamber is formed and on the other of which a recovery chamber is provided. A partition of such a simple plate can easily be prepared by, for example, firing a ceramic green sheet having a stoichiometric composition for the perovskite Li conducting solid electrolyte if fired. For this partition, the electrodes may be made of a metallic mesh covering the surface of the plate.

Where it is difficult to make the partition having a large area, the partition can be made up of a plurality of segments with the spaces between every two adjacent segments being sealed so as to obstruct the passage of liquid.

The partition can have a cylindrical form with its one end closed. In this structure, an electrode is set inside and outside the cylinder while assuring the contact of the crude liquid and the recovery liquid with the partition. The electrode set outside the cylinder can be a mesh covering the outer wall of the partition. Such a mesh electrode is effective in uniformly applying an electrical field to the partition. The cylindrical partition is put with its end downward into a tank containing a crude liquid or a recovery liquid. There are thus provided two chambers, inside and outside the cylindrical partition, one for the crude liquid and the other for the recovery liquid. This structure embraces an embodiment in which a plurality of cylindrical partitions are put in the same tank to attain a further increased contact efficiency between the crude liquid and the recovery liquid via the partition.

The uniformity of electrical field application across the partition can further be improved by providing a mesh electrode along the inner wall of the cylindrical partition as well as along the outer wall. In this case, a feed pipe made of metal for feeding a crude liquid or a recovery liquid can be inserted in the inside of the chamber made with the cylindrical partition in the axial direction of the cylinder. The feed pipe can be electrically connected to the inside mesh electrode to serve as an electrical collector for electricity flowing from or to the mesh electrode. This will be a compact means for applying an electrical field across the partition and supplying electricity across the electrode.

The partition can also have a honeycomb structure composed of a plurality of spaces each elongated in a direction are adjoined to each other in a plane intersecting to the elongated direction. The partition portion surrounding each of the spaces constitutes the above cylindrical part, thereby providing many spaces serving as the chambers. About half of the chambers are used as feed chambers for containing a crude liquid, and the chambers adjacent to the feed chambers are used as recovery chambers for containing a recovery liquid. According to this structure, the contact efficiency between the crude liquid and the recovery liquid is further increased, resulting in increased efficiency in lithium recovery. More specifically, the honeycomb structure can be composed of a plurality of hollow columns having a square section, arranged in a chessboard pattern. The feed chambers and recovery chambers are arranged alternately in the chessboard pattern. Thus, most of the partitions in the honeycomb shape can make effective the selective extraction of lithium, bringing a further increased efficiency in lithium recovery.

In the above honeycomb structure, the means for applying an electrical field comprises a plurality of wire or rod electrodes connected in series each inserted into each feed chamber from one end of the respective column chamber in the axial direction and a plurality of wire or rod electrodes connected in series each inserted in each recovery chamber in the axial direction from one end of the respective column chamber opposite to the end from which the electrodes for the feed chambers are inserted. A voltage is applied across the electrode in the feed chamber and the electrode in the recovery chamber adjacent to the feed chamber and thereby an electric field occurs through the part of the partition separating these two chambers. According to this structure, the electrical field can be applied uniformly through all of the partition, and the electrodes used can be of a simple structure and easily prepared.

The apparatus can have a feeding means for continuously feeding a crude liquid to the feed chamber and a discharging means for continuously discharging the crude liquid having its lithium component concentration reduced by lithium extraction into the recovery side. The apparatus can also have a means for continuously feeding a recovery liquid to the recovery chamber and a discharging means for continuously discharging the liquid having an increased lithium component concentration. According to this structure, feed and discharge of the crude liquid and recovery liquid can be carried out efficiently in a continuous manner, and large quantities of a crude liquid can be treated for extraction to a recovery liquid with good efficiency.

The apparatus having the above structure is designed so that the crude liquid fed from the opening of the feeding means is made to flow along the wall of the partition and is then discharged from the opening of the discharging means. In this case, even though a deposit adheres to the partition on the side of the feed chamber or the electrode formed along the partition, the flow of the crude liquid is effective in washing away the deposit and thereby preventing the partition from being reduced in its electrical current efficiency by the deposit. The apparatus can also be provided with a circulating means for returning the liquid discharged from the feed chamber to the feed chamber. The crude liquid can be repeatedly brought into contact with the partition by the circulation so that lithium can be extracted from the crude liquid continuously without waste.

The apparatus can also have a structure that the recovery liquid fed from the opening of the feeding means is made to flow along the wall of the partition and then discharged from the opening of the discharging means. For example, where lithium is extracted into an aqueous recovery solution, the extracted Li produces LiOH in the recovery solution, which LiOH tends to be deposited on the partition or the electrode in the recovery solution. According to this structure, the flow of the recovery liquid along the wall of the partition washes away the deposit such as LiOH, thereby preventing reduction of the electrical current efficiency of the partition. Further, the apparatus can be provided with a circulating means for recycling the recovery liquid which has been discharged from the recovery chamber by the discharging means to the recovery chamber. Thus, the recovery liquid can be repeatedly brought into contact with the partition by the circulation to increase the lithium concentration in the liquid in the recovery chamber.

A precipitant capable of reacting with the extracted lithium component to Form a precipitate can be added to the recovery liquid. In this case, the lithium component in the recovery liquid is immobilized as a precipitate, and the concentration of the dissolved lithium component in the liquid is reduced. As a result, deposition of LiOH, etc. on the partition or electrode is inhibited. Useful precipitants include carbon dioxide, which reacts with a dissolved lithium component to form sparingly soluble lithium carbonate ($Li_2CO_3$). The recovery chamber can be provided with a means for bubbling carbon dioxide through the recovery liquid. The recovery chamber can also have a means for separating the lithium-containing precipitate from the liquid, thereby facilitating the circulation of the liquid. The means for separating the precipitate can be a structure having a filter for collecting the precipitate from the liquid.

The present invention will further be illustrated in greater detail by way of Examples with reference to the accompanying drawings.

Figure 3A:
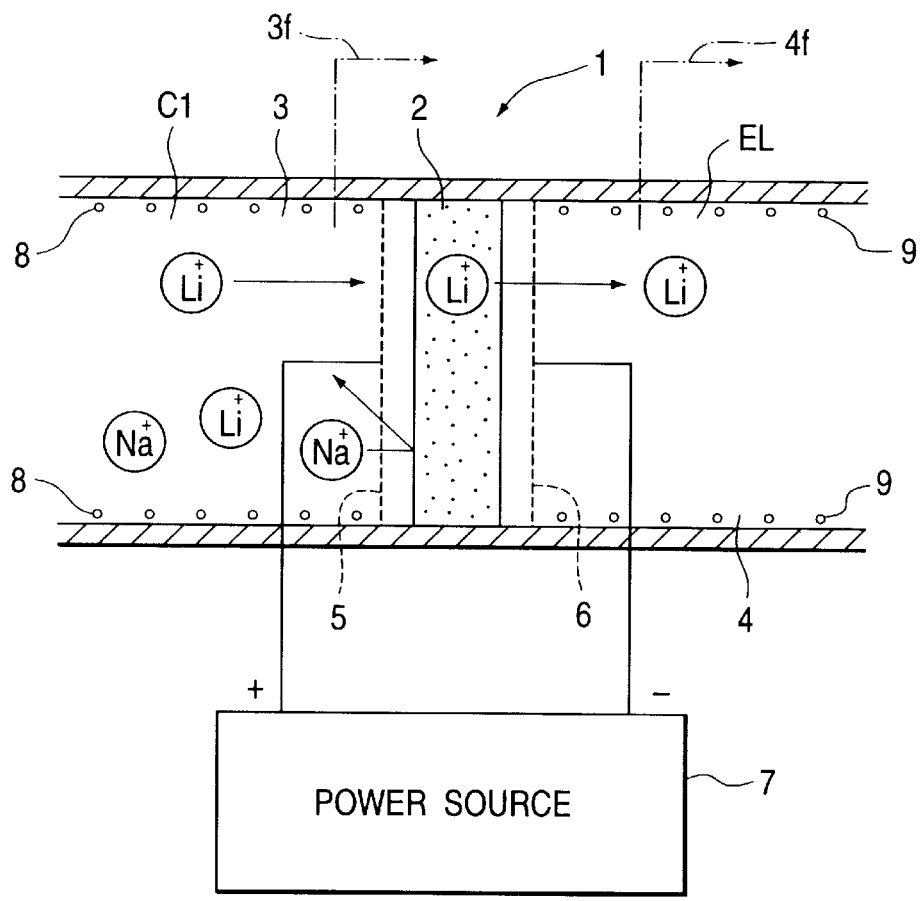
FIG. 3(a) is a sectional view of essential part of the apparatus according to the present -invention, which uses a lithium ion conducting solid electrolyte as a partition along which mesh electrodes are arranged, illustrating a basic mechanism of a selective extraction of lithium from a crude solution containing lithium and other components through the partition.

FIG. 3(a) is a schematic figure depicting the mechanism of the lithium extraction according to the present invention. The Li extraction apparatus 1 shown in FIG. 3 (a) has a partition 2 made of an Li solid electrolyte, a feed chamber 3 formed on one side of the partition 2 in which a crude liquid CL containing an Li component and impurities such as Na is introduced so as to come into contact with the partition 2, and a recovery chamber 4 formed on the opposite side of the partition 2 in which a recovery liquid EL is introduced so as to come into contact with the partition 2. On both sides of the partition 2 are set mesh electrodes 5 and 6 made of noble metal such as Ag, Pt, and an alloy thereof, to cover the wall of the partition 2. The electrode 5 in the feed chamber 3 is connected to the positive pole of a direct current power source 7, while the electrode 6 in the recovery chamber 4 is connected to the negative pole of the power source 7. The electrodes 5 and 6 and the direct current power source 7 constitute a means for applying an electrical field. In this Example, the crude liquid CL is an aqueous solution containing LiCl and, as an impurity, NaCl, and the recovery liquid EL is distilled water.

The Li solid electrolyte forming the partition 2 is a perovskite-type solid electrolyte represented by the formula: $(La_xLi_y)TiO_z$, wherein $x=(2/3)-a$, $y=3a-2b$, $z=3-b$, $0<a\leq 1/6$, $0\leq b\leq 0.06$, and $y>0$. The perovskite-type solid electrolyte represented by the above formula can be prepared as follows. Oxides of the constituent metallic elements or compounds of the elements capable of being converted to corresponding oxides in an oxidative atmosphere (such as nitrates and carbonates) are blended to prepare a mixed powder having a prescribed composition. The mixed powder is heated to 800 to 1100° C., preferably 900 to 1000° C., to synthesize a perovskite-type compound powder. The resulting powder, if necessary, mixed with an appropriate amount of a binder is formed into a partition of a prescribed shape by a known forming method, such as pressing (inclusive of cold hydrostatic pressing), injection molding, extrusion molding, slip casting, and the like. The resulting green body is sintered at 1100 to 1400° C.

Upon applying an electrical field by means of the electrodes 5 and 6 and the power source 7 in such a manner that the crude liquid side of the partition is positive and the recovery liquid side of the partition is negative, $Li^+$ in the crude liquid CL passes through the partition 2 into the recovery liquid EL. On the other hand, $Na^+$ as an impurity cannot pass through the partition 2 and remains in the crude liquid CL side. Thus only Li ions of the crude liquid CL can be extracted into the recovery liquid EL. Application of an electrical field to the partition 2 is accompanied by Joule's heat generation in the partition 2, which can be utilized for heating both the crude liquid CL and recovery liquid EL above room temperature. As a result, the solid electrolyte of the partition 2 exhibits increased ion conductivity to achieve improved extraction efficiency. In this case, the partition is to function as a heating means as well. The heating temperature of the crude liquid CL and the recovery liquid EL is preferably not higher than their boiling point, i.e., not higher than 100° C., most preferably from 70 to 90° C. It is also possible to provide heaters 8 and 9 in the feed chamber 3 and the recovery chamber 4, respectively, as a separate heating means with which the crude liquid CL and the recovery liquid EL are heated.

In order to increase the rate of Li ion extraction, it is effective to increase the electric voltage (current) applied across the partition 2. This can be done by (1) increasing the voltage as far as water does not undergo electrolysis (in the case of using an aqueous crude liquid). (2) setting the electrodes 5 and 6 as close as possible to the partition 2, (3) increasing the facing area of the electrodes 5 and 6 to the partition 2, and (4) reducing the thickness of the partition 2 as long as the strength is not impaired to decrease the electrical resistance of the partition 2 against the current. The thickness of the partition 2 is preferably 0.1 to 2 mm. If it is less than 0.1 mm, the partition is liable to break due to insufficient strength. If it exceeds 2 mm, the electrical resistance of the partition is too high to obtain a sufficient current density, resulting in reduction of Li extraction efficiency.

Figure 3B:
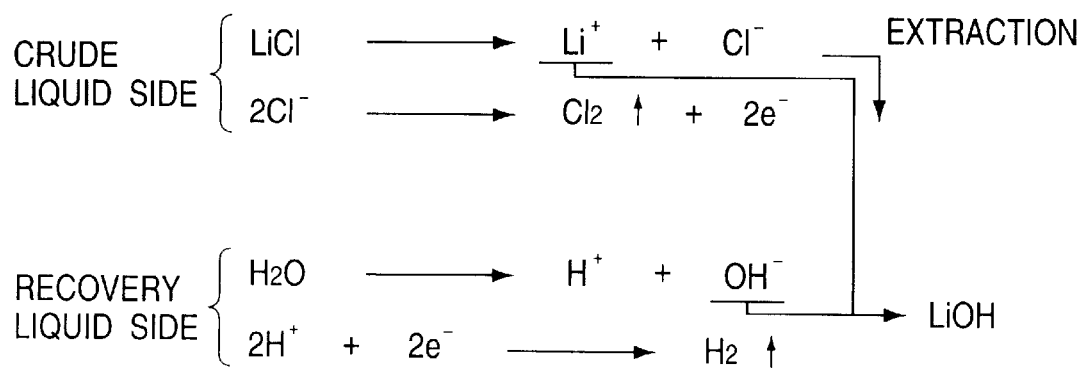

FIG. 3(b) shows the reactions occurring in the crude liquid CL side and the recovery liquid EL side during extraction with using of a crude liquid (CL) containing LiCl. As lithium ions are extracted into the recovery liquid EL side, chlorine gas ($Cl_2$) evolves. It is desirable therefore that a venting means 3f for discharging and collecting chlorine gas be provided in the feed chamber 3. In the recovery liquid EL side, on the other hand, a reaction between the extracted Li ions and water produces LiOH and hydrogen gas ($H_2$). It is desirable therefore that a venting means 4f for discharging hydrogen gas be provided in the recovery chamber 4.

Various other embodiments of the Li extraction apparatus 1 according to the invention are described below with reference to FIGS. 4 through 12.

The apparatus 1 shown in FIG. 4 comprises a tank 10 and a cylinder 11 with an open end 11a which pierces one side of the tank 10 so that the open end 11a is in the recovery chamber 4. The inside space of the tank 10 is used as a recovery chamber 4, and that of the cylinder 11 as a feed chamber 3. Into the opening 11a of the cylinder 11 is fitted a plate of an Li solid electrolyte to form a partition 2. Mesh electrodes 5 and 6 each connected to a direct current power source 7 are set on each side of the partition 2.

A feed opening 12 for feeding a crude liquid CL to the feed chamber 3 and a discharge opening 13 for discharging the crude liquid CL from the feed chamber 3 are provided at the end of the cylinder 11 opposite to the end 11a where the partition 2 is fitted. The discharged crude liquid CL passes through a circulating pipe 14 and returns to the feed chamber 3 through the feed opening 12 by means of a circulating pump 15 provided in the middle of the pipe 14. That is, the circulating pipe 14 and the pump 15 compose a feeding means, a discharging means, and a circulating means for the crude liquid. The circulating pipe 14 can have a discharge pipe 20 with a valve 21 and a feed pipe 22 with a valve 23. When the lithium concentration of the circulating crude liquid CL decreases to a given level as a result of continuous lithium extraction, the valve 21 is opened to discharge the treated CL through the discharge pipe 20, and then the valve 23 is opened to supply an untreated crude liquid to the crude liquid CL system.

The tank 10 has a feed opening 16 for feeding a recovery liquid EL to the recovery chamber 4 and a discharge opening 17 for discharging the recovery liquid EL from the recovery chamber 4. The discharged recovery liquid EL passes through a circulating pipe 18 and returns to the recovery chamber 4 by means of a circulating pump 19 provided in the middle of the pipe 18. That is, the circulating pipe 18 and the pump 19 compose a feeding means, a discharging means, and a circulating means for the recovery liquid. The circulating pipe 18 can have a discharge pipe 24 with a valve 25 and a feed pipe 26 with a valve 27. When the lithium concentration of the circulating recovery liquid EL increases to a desired level as a result of continuous lithium extraction, the recovery liquid EL is discharged through the discharge pipe 24, and then a fresh recovery liquid is supplied from the feed pipe 26 to the recovery system.

The apparatus 1 shown in FIG. 5(a) comprises a tank 30 that is partitioned with a partition 2 into a feed chamber 3 and a recovery chamber 4. A circulating pipe 14 is connected to the feed chamber 3 in the same manner as described above so that a crude liquid CL can be circulated by means of a pump 15 provided in the middle of the pipe 14. A reservoir tank 31 for reserving the crude liquid CL is provided on the route of the circulation pipe 14. A recovery liquid EL is continuously fed from a feed tank 32 through a feed pipe 33 to the recovery chamber 4 by means of a pump 34 provided in the middle of the pipe 33. The recovery liquid EL is continuously discharged from the recovery chamber 4 through a discharge pipe 35 by means of a pump 36 (The recovery liquid EL is not circulated).

As shown in FIG. 5(b) the recovery chamber 4 is further partitioned with a wall 4c into a precipitation chamber 4a on the side of the partition 2 and a pre-discharge chamber 4b on the other side of the wall 4c. A fresh recovery liquid EL is fed to the precipitation chamber 4a. The precipitation chamber 4a is equipped with a bubbling nozzle 38 having a number of jet nozzles. Carbon dioxide ($CO_2$) is fed to the nozzle 38 through a feed pipe 39 whereby $CO_2$ bubbles up the recovery liquid EL in the precipitation chamber 4a.

Lithium ions extracted into the recovery liquid EL become LiOH. If the LiOH concentration in the recovery liquid EL increases, there are cases in which LiOH is deposited and adhered to the partition 2 and the electrode 6 to hinder the passage of electricity. Where the recovery liquid EL is bubbled by $CO_2$ as described above, LiOH reacts with $CO_2$ to become sparingly soluble $Li_2CO_3$ which precipitates in the precipitation chamber 4a, and is thus separated from the recovery liquid EL. The precipitated $Li_2CO_3$ can be collected through a pipe 40 provided at the bottom of the precipitation chamber 4a. The recovery liquid EL from which the lithium component has been separated overflows the wall 4c into the pre-discharge chamber 4b and is continuously discharged from the discharge pipe 35 by means of the pump 36. $Li_2CO_3$, if remaining in the recovery liquid EL in the chamber 4b, is trapped by a filter unit 37 provided on the discharge pipe 35.

If it is difficult to make a partition of an integral solid electrolyte having large areas, the partition can be made up of a plurality of segments as shown in FIG. 6. The partition 2 of FIG. 6 is composed of a plurality of plate segments 41 made of an Li solid electrolyte which are arranged on the same plane and a sealing part 42 which fills every gap among the segments 41 to block the passage of liquid through the gaps. The sealing part 42 is, for example, a plastic frame integrally molded with the segments 41 by injection molding, etc. The sides of each segment 41 can have a mating protrusion 42a (e.g., a line protrusion) for biting into the sealing part 42 or a mating cut (e.g., a groove) into which the sealing part 42 bites so that the segments 41 may not fall off the sealing part 42.

In the apparatus shown in FIG. 7, a partition 2 having a cylindrical form with its bottom closed is inserted in a tank 10 with its closed bottom down to provide two chambers; one surrounded by the inner wall of the tank 10 and the outer surface of the partition 2, which can serve as a recovery chamber 4; and the other formed inside the partition 2, which can serve as a feed chamber 3. The tank 10 is composed of an open-top main body 10a having a flange 10c around its opening 1ob and a shield 10f that covers the opening 10b of the main body 10a with watertightness. The shield 10f is removably fitted to the flange 10c with a fixture 10e, e.g., a bolt and a nut, via a gasket 10d made of rubber, etc.

The shield 10f has a through-hole 10g in its thickness direction. The upper part of the inner wall of the through-hole 10g is cut out to make a terrace 10h, on which a gasket 10i whose inner diameter is slightly smaller than the outer diameter of the partition 2 is fitted. The partition 2 has a closed bottom having a semispherical shape and an open top 2a having a flange 2b. The partition 2 is inserted into the tank 10 through the hole 10g and fixed to the upper side of the shield 10f at its flange 2b via the gasket 10i. The partition 2 having the above-mentioned shape can be prepared by, for example, casting a slurry of a raw material powder mixture into a liquid-absorbing mold (called slip casting) and firing the resulting green cast body.

A mesh electrode 6 shaped along the outside of the partition 2 is set to cover almost the entire outer wall of the partition 2. Similarly, a mesh electrode 5 shaped along the inner wall of the cylindrical partition 2 is set inside the partition 2 to cover almost the entire inner wall of the partition 2. As shown in FIG. 8, the mesh electrode 6 is composed of a metal frame 6c and metal meshes 6d that are fixed to the frame 6c to cover it. The metal frame 6c is constructed of a plurality of ring members 6a which are concentric with the partition 2 and are set at a prescribed interval in the axial direction of the partition 2 and a plurality of linking members 6b that are parallel to the axial direction of the partition 2 and link the ring members 6a.

The mesh electrode 5 is constructed in almost the same manner as for the mesh electrode 6. A feed pipe 43 for feeding a crude liquid CL to the feed chamber 3 is inserted through the inside of the metallic frame 5c. The feed pipe 43 is made of metal and is electrically connected to ring members 5a with radially arranged linking members 5e. As shown in FIG. 7, the opening 2a of the partition 2, while having inserted therein the mesh electrode 5 and the feed pipe 43, is sealed watertightly with a stopper 44 made of rubber, etc. The feed pipe 43 and a discharge pipe 45 for the crude liquid CL pierce the stopper 44 and extend outside the partition 2.

A recovery liquid EL is fed from the feed opening 16 into the recovery chamber 4 and discharged from the discharge opening 17, while a crude liquid CL is fed through the feed pipe 43 to the feed chamber 3 and discharged through the discharge pipe 45. In this situation, a power source (not shown) is turned on to apply an electrical field to the partition 2 via the mesh electrodes 5 and 6 in such a manner that the feed chamber side is positive and the recovery chamber side is negative, whereby Li ions in the crude liquid CL selectively migrate through the partition 2 into the recovery liquid EL. In the above-described structure, electricity from the power source runs through the metallic feed pipe 43 and flows to the mesh electrode 5 in the crude liquid chamber 3. That is, the feed pipe 43 also serves as an electric collector for transmitting electricity to the mesh electrode 5.

The apparatus can have a plurality of the cylindrical partitions 2 as shown in FIG. 9(a). In this case, the shield 10f has a plurality of through-holes 10g for inserting the partitions 2 therethrough. As in the example shown in FIG. 9(b), the crude liquid CL discharged from every feed chamber 3 can overflow the respective discharge pipes 45, spread over the upper surface of the shield 10f, and be discharged from an outlet 46 provided at the upper part of the main tank body 10a. In this example, the shield 10f is fixed to the main body 10a by fitting its periphery into a groove 10k via a gasket 10l, the groove 10k being made on the upper inner wall of the main body 10a at a prescribed depth from the top of the wall.

In FIG. 10 is illustrated a partition 2 having a honeycomb structure. The honeycomb structure of the partition 2 is comprised of a plurality of spaces 47 (hereinafter sometimes referred to as column) each elongated in a direction adjoined to each other in a plane intersecting to the elongated direction, each serving like a cylindrical partition as referred to above. More specifically, the columns 47 each have a square section and are arranged in a chessboard pattern, thus providing a plurality of spaces, in which feed chambers 3 and recovery chambers 4 alternate as shown in FIG. 11(b). The partition having such a honeycomb structure can be prepared by, for example, mixing a raw material powder mixture with a binder to prepare a compound, molding the compound by extrusion or injection molding, and firing the resulting green body.

FIG. 11 schematically illustrates an Li extraction apparatus 1 constructed with the above-described honeycomb partition 2. Both the upper and lower openings of all the columns are sealed watertightly with stoppers 48 made of plastic, metal, etc. via sealing members (gaskets) 49. A wire or rod electrode 5 (electrode for a feed chamber) is inserted into each column serving as a feed chamber from one of the ends through the stopper 48 in the axial direction. The plurality of the electrodes 5 are connected in series and led to the positive pole of a direct current power source (not shown). Similarly, a wire or rod electrode 6 (electrode for a recovery chamber) is inserted into each column serving as a recovery chamber from the opposite end of the column (opposite to the end from which the electrode 5 is inserted) through the stopper 48 in the axial direction. The plurality of the electrodes 6 are connected in series and led to the negative pole of the direct current power source. In each feed chamber and each recovery chamber, a feed opening 12 or 16 and a discharge opening 13 or 17 are provided through the stopper 48 at the end opposite to the end from which the electrode 5 or 6 is inserted. A crude liquid CL and a recovery liquid EL are fed to the respective chambers from the feeding opening 12 or 16, respectively, and discharged from the discharge opening 13 or 17, respectively.

A voltage from the direct current power source is applied to the part of the partitions 2 separating each feed chamber 3 and each recovery chamber 4 by way of each pair of electrodes 5 and 6 put in these chambers, whereby Li ions are extracted into a recovery liquid EL in each recovery chamber 4 from the crude liquid in all the surrounding feed chambers 3 through the surrounding partition 2 as depicted in FIG. 11(b).

As shown in FIG. 12, a feed opening 16 for feeding a recovery liquid can be formed near the border of the recovery chamber 4 (i.e., near the partition 2), and the discharge opening 17 for discharging the recovery liquid can be formed near the opposite border. In this case, the recovery liquid EL fed from the feed opening 16 is made to flow along the wall of the partition 2 and then discharged from the discharge opening 17. The flow of the recovery liquid EL along the wall of the partition 2 is effective to wash away a deposit on the wall, such as LiOH that is formed from the extracted lithium component. The same manipulation can be applied to the feed chamber to make a flow of the crude liquid CL along the wall of the partition 2.

While the invention has been described in detail and with reference to specific examples thereof, it will be apparent to one skilled in the art that various changes and modifications can be made therein without departing from the spirit and scope thereof.

What is claimed is:

1. A method for extracting lithium from a crude liquid containing a lithium component and an impurity, which comprises:

bringing the crude liquid into contact with one side of a partition constituted mainly of a perovskite structure, lithium-ion conducting solid electrolyte while bringing a recovery liquid into contact with the other side of the partition; and applying an electrical field across the partition in such a manner that the crude liquid side is positive and the recovery liquid side is negative thereby to selectively extract the lithium from the crude liquid through the partition into the recovery liquid.

2. An apparatus for extracting lithium from a crude liquid containing a lithium compound and an impurity, which comprises:

a partition constituted mainly of a perovskite structure, lithium ion conducting solid electrolyte;

a feed chamber, formed on one side of said partition, into which feed chamber the crude liquid is capable of being introduced so as to come into contact with the partition;

a recovery chamber for collecting lithium, formed on other side of the partition, into which recovery chamber a liquid for collecting liquid: recovery liquid, is capable of being introduced so as to come into contact with the partition; and a means for applying an electrical field across the partition in such a manner that the crude liquid is positive and the recovery liquid is negative thereby to selectively allow the lithium in the form of ions of the crude liquid to pass through the partition into the recovery chamber.

3. A method for extracting lithium from a crude liquid containing a lithium component and an impurity, which comprises:

bringing the crude liquid into contact with one side of a partition constituted mainly of a perovskite structure lithium ion conducting solid electrolyte represented by $(La_x,Li_y)TiO_z$, wherein $x=(2/3)-a$, $y=3a-2b$, $z=3-b$, $0<a\leq 1/6$, $0\leq b\leq 0.06$, and $y>0$, or the perovskite-type solid electrolyte with part of the La ions substituted with metallic ions having a larger ionic radius than an La ion while bringing a liquid for lithium recovery into contact with the other side of said partition; and applying an electrical field to said partition in such a manner that the crude liquid side is positive and the recovery liquid side is negative thereby to selectively allow the lithium component of said crude liquid to pass through said partition in the form of Li ions into the recovery liquid side.

4. The method according to claim 3, wherein said perovskite structure lithium ion conducting solid electrolyte has a composition in which x ranges from 1/2 to 2/3 and y is not more than 1/2.

5. The method according to claim 3, wherein said crude liquid and said recovery liquid both mainly comprise water.

6. The method according to claim 3, wherein said crude liquid and said recovery liquid are controlled to be a temperature not more than their boiling points.

7. The method according to claim 3, wherein said crude liquid and said recovery liquid are heated by the Joule's heat of said partition.

8. An apparatus for extracting lithium from a crude liquid containing a lithium compound and an impurity, which comprises:

a partition constituted mainly of a lithium ion conducting solid electrolyte;

a feed chamber formed on one side of said partition in which said crude liquid is capable of being introduced so as to come into contact with said partition;

a recovery chamber formed on the other side of said partition in which a liquid for recovery is capable of being introduced so as to come into contact with said partition; and means for applying an electrical field which applies an electrical field to said partition by way of a pair of electrodes that are set on both sides of the partition while assuring the contact of the crude liquid and the recovery liquid with said partition, wherein at least one of said electrodes is shaped along the surface of said partition in such a manner that the crude liquid side of the partition is positive and the recovery liquid side of the partition is negative, wherein the apparatus is capable of having an electrical field applied to said partition to selectively allow the lithium component of the crude liquid to pass through said partition in the form of Li ions into the recovery liquid side.

9. The apparatus according to claim 8, wherein said lithium ion conducting solid electrolyte is mainly constituted by a perovskite structure, lithium ion conducting solid electrolyte represented by $(La_x,Li_y)TiO_z$, wherein $x=(2/3)-a$, $y=3a-2b$, $z=3-b$, $0<a\leq 1/6$, $0\leq b\leq 0.06$, and $y>0$, or the perovskite-type solid electrolyte with part of the La ions substituted with metallic ions having a larger ionic radius than an La ion.

10. The apparatus according to claim 8, wherein said apparatus has a temperature control means for heating the temperature of said crude liquid and said recovery liquid to a temperature below their boiling point.

11. The apparatus according to claim 10, wherein said temperature control means is utilization of the Joule's heat generated in said partition.

12. The apparatus according to claim 8, which further comprises a feeding means for feeding said crude liquid to said feed chamber, and a discharging means for discharging the crude liquid having its lithium component concentration reduced by lithium extraction.

13. The apparatus according to claim 8, which further comprises a means for continuously feeding said liquid for recovery to said recovery chamber and a discharging means for continuously discharging the liquid for recovery having its lithium component concentration increased by lithium extraction.

14. An apparatus for extracting lithium from a crude liquid containing a lithium compound and an impurity, which comprises:

a partition comprising (i) a plurality of segments constituted mainly of a lithium ion conducting solid electrolyte and (ii) a sealing member for sealing the gaps among the segments to block the passage of liquid;

a feed chamber formed on one side of said partition in which said crude liquid is capable of being introduced so as to come into contact with said partition;

a recovery chamber formed on the other side of said partition in which a liquid for recovery is capable of being introduced so as to come into contact with said partition; and a means for applying an electrical field which applies an electrical field to said partition in such a manner that the crude liquid side of the partition is positive and the recovery liquid side of the partition is negative, wherein the apparatus is capable of having an electrical field applied to said partition to selectively allow the lithium component of the crude liquid to pass through said partition in the form of Li ions into the recovery liquid side.

15. The apparatus according to claim 14, wherein said lithium ion conducting solid electrolyte is mainly constituted of a perovskite structure, lithium ion conducting solid electrolyte represented by $(La_x,Li_y)TiO_z$, wherein $x=(2/3)-a$, $y=3a-2b$, $z=3-b$, $0<a\leq 1/6$, $0\leq b<0.06$, and $y>0$, or the perovskite-type solid electrolyte with part of the La ions substituted with metallic ions-having a larger ionic radius than an La ion.

16. An apparatus for extracting lithium from a crude liquid containing a lithium compound and an impurity, which comprises:

a partition constituted mainly of a lithium ion conducting solid electrolyte;

a feed chamber formed on one side a said partition in which said crude liquid is capable of being introduced so as to come into contact with said partition;

a recovery chamber formed on the other side of said partition in which a liquid for recovery is capable of being introduced so as to come into contact with said partition; and a means for applying an electrical field which applies an electrical field to said partition in such a manner that the crude liquid side of the partition is positive and the recovery liquid side of the partition is negative, in which apparatus said partition has a cylindrical part to provide an inside chamber and an outside chamber, one being for the crude liquid and the other being for the liquid for recovery, and wherein the apparatus is capable of having an electrical field applied to said partition to selectively allow the lithium component of the crude liquid to pass through said partition in the form of Li ions into the recovery liquid side.

17. The apparatus according to claim 16, wherein said partition has a cylindrical part whose one end is closed; a pair of electrodes are set on each side of said partition while assuring the contact of the crude liquid and the recovery liquid with said partition, the electrode set outside the partition being mesh-shaped along the outer wall of said partition; and wherein the apparatus is capable of having an electrical field applied to said partition by way of said electrodes.

18. The apparatus according to claim 17, wherein a mesh electrode is provided along the inner wall of said cylindrical partition, and a feed pipe made of metal for feeding the crude liquid or the liquid for recovery is inserted in the inside of said cylindrical partition in the axial direction of the cylinder, said feed pipe being electrically connected to said mesh electrode to serve as an electrical collector for transmitting electricity to said mesh electrode.

19. The apparatus according to claim 16, wherein said apparatus comprises a tank for containing the crude liquid or the liquid for recovery, and said cylindrical part is put in said tank with its closed end down to provide two chambers inside and outside said cylindrical part, one for the crude liquid and the other for the recovery liquid.

20. The apparatus according to claim 16, wherein said partition has a honeycomb structure in which a plurality of spaces each elongated in a direction are adjoined to each other in a plane intersecting to the elongated direction; a partition surrounding each of the spaces constitutes the cylindrical part; a part of said plurality of spaces are used as feed chambers containing the crude liquid; and the chambers adjacent to said feed chambers are used as recovery chambers containing the liquid for recovery.

21. The apparatus according to claim 20, wherein said plurality of spaces each has a square section and are arranged in a chalkboard pattern, and said feed chambers and recovery chambers alternate in said chalkboard pattern.

22. The apparatus according to claim 20, wherein said means for applying an electrical field comprises a plurality of wire or rod electrodes connected in series each inserted into each feed chamber from one end of the respective chamber in the axial direction and a plurality of wire or rod electrodes connected in series each inserted in each recovery chamber in the axial direction from one end of the respective chamber opposite to the end from which the electrodes for the feed chambers are inserted so that a voltage can be applied between an electrode in a feed chamber and an electrode in a recovery chamber adjacent to said feed chamber through the partition separating these two chambers.

23. The apparatus according to claim 16, wherein said lithium ion conducting solid electrolyte is mainly constituted of a perovskite structure, lithium ion conducting solid electrolyte represented by $(La_x,Li_y)TiO_z$, wherein $x=(2/3)-a$, $y=3a-2b$, $z=3-b$, $0<a\leq 1/6$, $0\leq b\leq 0.06$, and $y>0$, or the perovskite-type solid electrolyte with part of the La ions substituted with metallic ions having a larger ionic radius than an La ion.

24. An apparatus for extracting lithium from a crude liquid containing a lithium compound and an impurity, which comprises:

a partition constituted mainly of a lithium ion conducting solid electrolyte;

a feed chamber formed on one side of said partition in which said crude liquid is capable of being introduced so as to come into contact with said partition;

a recovery chamber formed on the other side of said partition in which a liquid for recovery is capable of being introduced so as to come into contact with said partition;

a means for applying an electrical field which applies an electrical field to said partition in such a manner that the crude liquid side of the partition is positive and the recovery liquid side of the partition is negative;

a feeding means for continuously feeding said crude liquid to said feed chamber; and a discharging means for continuously discharging the crude liquid having its lithium component concentration reduced by lithium extraction into the recovery liquid side, wherein the apparatus is capable of having an electrical field applied to said partition to selectively allow the lithium component of said crude liquid to pass through said partition in the form of Li ions into the recovery side.

25. The apparatus according to claim 24, wherein said apparatus further comprises a means for continuously feeding said liquid for recovery to said recovery chamber and a discharging means for continuously discharging the liquid for recovery having its lithium component concentration increased by lithium extraction.

26. The apparatus according to claim 25, wherein the feeding means and discharge means are situated such that the liquid for recovery fed from the opening of said feeding means is made to flow along the wall of the partition and is then discharged from the opening of said discharging means.

27. The apparatus according to claim 25, wherein said apparatus further comprises a circulating means for returning the liquid for recovery discharged from said recovery chamber by said discharging means to said recovery chamber.

28. The apparatus according to claim 24, wherein the feeding means and discharge means are situated such that the crude liquid fed from the opening of said feeding means is made to flow along the wall of the partition and is then discharged from the opening of said discharging means.

29. The apparatus according to claim 24, wherein said apparatus further comprises a circulating means for returning the crude liquid discharged from said feed chamber by said discharging means to said feed chamber.

30. The apparatus according to claim 24, wherein said liquid for recovery contains a precipitant capable of reacting with an extracted lithium component to form a precipitate, and said apparatus has a means for separating the precipitate from the liquid for recovery.

31. The apparatus according to claim 24, wherein said lithium ion conducting solid electrolyte is mainly constituted of a perovskite structure, lithium ion conducting solid electrolyte represented by $(La_x,Li_y)TiO_z$, wherein $x=(2/3)-a$, $y=3a-2b$, $z=3-b$, $0<a\leq 1/6$, $0\leq b\leq 0.06$, and $y>0$, or the perovskite-type solid electrolyte with part of the La ions substituted with metallic ions having a larger ionic radius than an La ion.

* * * * *